United States Patent
Tabata

(10) Patent No.: US 6,428,444 B1
(45) Date of Patent: Aug. 6, 2002

(54) APPARATUS FOR CONTROLLING A VEHICLE AND A METHOD OF CONTROLLING THE VEHICLE

(75) Inventor: Atsushi Tabata, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/655,451

(22) Filed: Sep. 5, 2000

(30) Foreign Application Priority Data

Sep. 6, 1999 (JP) .......................................... 11-252191
Sep. 27, 1999 (JP) .......................................... 11-272861

(51) Int. Cl.[7] .............................................. B60K 1/02
(52) U.S. Cl. .............................. 477/3; 477/15; 475/2; 475/5; 180/165.2; 180/65.3
(58) Field of Search ........................... 477/3, 7, 12, 14, 477/17, 20; 475/2, 5; 180/65.1–65.5

(56) References Cited

U.S. PATENT DOCUMENTS

| | | | | |
|---|---|---|---|---|
| 5,117,931 A | * | 6/1992 | Nishida | 180/65.2 |
| 5,415,139 A | * | 5/1995 | Aoto et al. | 123/192.1 |
| 6,083,138 A | * | 7/2000 | Aoyama et al. | 477/5 |
| 6,158,541 A | * | 12/2000 | Tabata et al. | 180/165 |
| 6,201,312 B1 | * | 3/2001 | Shioiri et al. | 290/40 C |
| 6,249,723 B1 | * | 6/2001 | Lutz | 701/22 |
| 6,263,267 B1 | * | 7/2001 | Anthony et al. | 701/22 |
| 6,295,487 B1 | * | 9/2001 | Ono et al. | 701/22 |

FOREIGN PATENT DOCUMENTS

| | | |
|---|---|---|
| JP | 8-177994 | 7/1996 |
| JP | 9-280085 | 10/1997 |
| JP | 09308007 | * 11/1997 |
| JP | 10024745 | * 1/1998 |
| JP | 10-037776 | 2/1998 |

* cited by examiner

*Primary Examiner*—Dirk Wright
*Assistant Examiner*—Tisha D. Lewis
(74) *Attorney, Agent, or Firm*—Oblon, Spivak, McClelland, Maier & Neustadt, P.C.

(57) ABSTRACT

An apparatus for controlling a vehicle which prevents a frequent gear shift called "busy-shift" caused by a varying driving condition. A plurality of wheels, a first power source, a second power source, an electric power supply, and a transmission between the wheel and at least one of the power sources are mounted in the vehicle. The apparatus for controlling the vehicle includes a detecting and a torque change. The detecting means detects a selected gear ratio of the transmission. Since torque of the second power source is increased or decreased in response to the selected gear ratio which is detected by the detecting, a fluctuation of the driving torque of the vehicle is restrained. Consequently, a frequent gear shift "busy-shift" can be avoided.

49 Claims, 16 Drawing Sheets

FIG.4

|     | K0 | K1 | K2 | K3 | B0 | B1 | B2 | B3 | B4 | F0 | F1 | F2 |
|-----|----|----|----|----|----|----|----|----|----|----|----|----|
| P   | O  |    |    |    |    |    |    |    |    | O  |    |    |
| R   |    |    | O  |    | O  |    |    |    | O  |    |    |    |
| N   | O  |    |    |    |    |    |    |    |    | O  |    |    |
| 1st | O  | O  |    |    |    |    |    |    | ◉  | O  |    | O  |
| 2nd | ◉  | O  |    |    |    |    |    | O  |    | O  |    |    |
| 3rd | O  | O  |    |    |    | ◉  | O  |    |    | O  | O  |    |
| 4th | O  | O  |    | O  |    |    | △  |    |    | O  |    |    |
| 5th |    | O  |    | O  | O  |    | △  |    |    |    |    |    |
| 6th | O  |    |    | O  |    | O  | △  |    |    | O  |    |    |

○ ENGAGED
◉ ENGAGED IN ENGINE BRAKING
△ ENGAGED BUT NO POWER TRANSMITTING

| SHIFT LEVER POSITION | SELECTABLE SHIFT GEAR |
|---|---|
| D | 1st, 2nd, 3rd, 4th, 5th, 6th |
| 5 | 1st, 2nd, 3rd, 4th, 5th |
| 4 | 1st, 2nd, 3rd, 4th |
| 3 | 1st, 2nd, 3rd |
| 2 | 1st, 2nd |
| L | 1st |

D POSITION

"2" POSITION

APPARATUS FOR CONTROLLING A VEHICLE AND A METHOD OF CONTROLLING THE VEHICLE

FIELD OF THE INVENTION

The present invention relates to an apparatus for controlling a vehicle having a plurality of power sources and a transmission in which a gear ratio can be controlled on the basis of a driving condition such as, for example, a load against a power source of a vehicle, a vehicle speed, etc.

BACKGROUND OF THE INVENTION

A power source or power sources such as, for example, an internal combustion engine or/and an electric motor, etc. are installed in a vehicle. Since characteristics of such a power source do not necessarily satisfy an output power required over the entire range of a vehicle from starting to high speed running, a transmission is mounted in the vehicle in addition to the power source in order to increase or reduce driving torque or a rotation speed of the power source. As one example of the transmission, an automatic transmission, which is automatically controlled to shift gears according to a running condition of the vehicle, is adopted in many cases. Furthermore, in accordance with a required improvement of power output characteristics or a required reduction of fuel consumption of the vehicle, the smallest gear ratio of the automatic transmission tends to be smaller than 1. A revolution of the power source can be reduced in high speed running of the vehicle, owing to the above-mentioned automatic transmission.

In the aforementioned background, there is a current tendency for an automatic transmission to have multiplied shift gears. One example of such an automatic transmission is shown in Japanese Laid-Open Patent Application No. 8-177994. The automatic transmission shown in this Patent Application, has a structure mainly having 3 sets of planetary gears, and $5^{th}$ gear and $6^{th}$ gear are overdrive gears. Furthermore, rotation speeds of rotating members of the automatic transmission in $6^{th}$ gear are restrained low.

In the automatic transmission with six forward gears, the gear ratio of the highest gear (i.e. the smallest gear ratio of the automatic transmission) is smaller than a gear ratio of the highest gear ratio of an automatic transmission with five forward gears. Since engine revolutions in a vehicle having the automatic transmission can be reduced, the fuel consumption of the vehicle is improved during high speed driving. Furthermore, since excessive high rotation speeds of rotating members can be avoided, a durability of the automatic transmission is improved.

Since the gear ratio of $6^{th}$ gear, as the highest gear, is low, however, the driving torque of the vehicle in $6^{th}$ gear is low. $6^{th}$ gear is set, when a load of the engine is low (i.e. a throttle angle or accelerator angle is low) and a speed of the vehicle is rather high. Consequently, even though the speed of the vehicle reduces only by a little, or the engine load increases only by a little by depressing an accelerator pedal of the vehicle, for example when the vehicle enters into a slope, a down-shift of the automatic transmission from $6^{th}$ gear to $5^{th}$ gear occurs, because a driving condition of the vehicle enters into a range of $5^{th}$ gear. If the speed of the vehicle is higher or the engine load is lower by pulling back the accelerator pedal after the down-shift happens, the up-shift of the automatic transmission occurs, because the driving condition of the vehicle again enters into a range of $6^{th}$ gear.

As mentioned above, from the viewpoint of a fuel efficiency of the vehicle it is advantageous that the automatic transmission has multiple shift gears. On the contrary, however, an up-shift or a down-shift of the automatic transmission frequently occurs, caused by only a little fluctuation of the driving condition of the vehicle. Such a phenomenon is called "busy-shift". That is, a driver of the vehicle might feel uncomfortable, because of the busy-shift.

SUMMARY OF THE INVENTION

It is thus one object of the present invention to solve the aforementioned problems. That is, the object of the invention is to provide an apparatus for controlling a vehicle with a plurality of power sources and an automatic transmission, which prevents the automatic transmission from the above-mentioned busy-shift caused by a lower gear ratio of the highest gear. Another object is to provide a method for controlling the vehicle.

An apparatus controls a vehicle comprising at least one wheel, a first power source, a second power source, an electric power supply, and a transmission between the wheel and at least one of the power sources. The transmission transmits driving power to the wheel. The apparatus comprises a detecting means and a torque change means. The detecting means detects a selected gear ratio of the transmission. The torque change means increases or decreases a torque of the second power source in response to the selected gear ratio of the transmission.

Since torque of the second power source is increased or decreased in response to the selected gear ratio which is detected by the detecting means, a fluctuation of the driving torque of the vehicle is restrained low. Consequently, a frequent gear shift (called "busy-shift") can be avoided.

If the detecting means detects a condition that causes power outputted by the second power source to fall and a suitable control mode for such a condition is selected, the undesirable influence caused by the fall of the power can be reduced.

BRIEF DESCRIPTION OF THE DRAWINGS

The above and other objects, features, advantages, and technical and industrial significance of this invention will be better understood by reading the following detailed description of a presently preferred embodiment of the invention, when considered in connection with the accompanying drawing, in which:

FIG. 4 is a diagram which shows an engagement and a disengagement of each clutch, brake, or one-way clutch for setting each shift gear and each shift position of the automatic transmission;

DETAILED DESCRIPTION OF PREFERRED EMBODIMENTS

Figure 2:
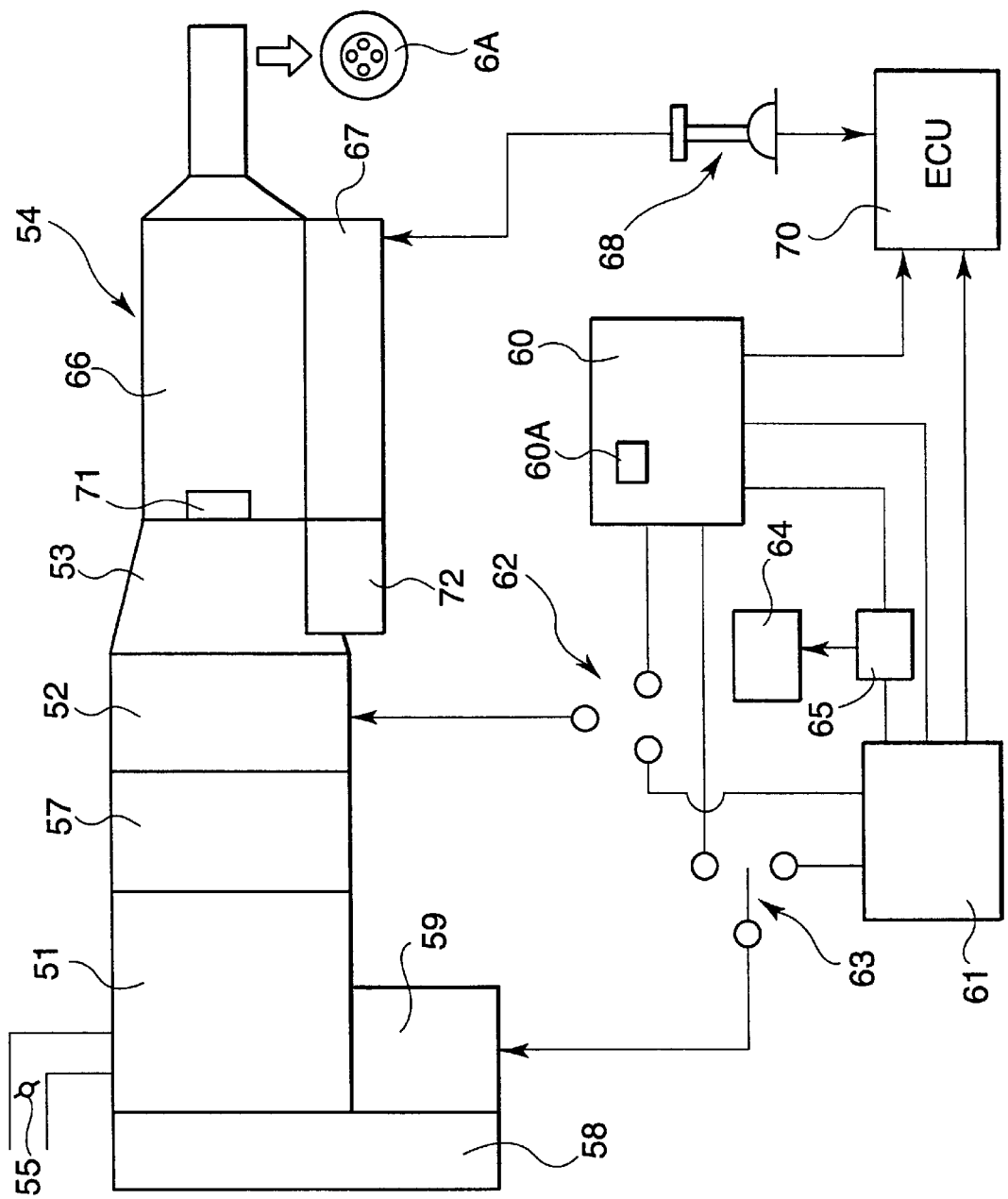
FIG. 2 is a schematic view of a power train for a hybrid vehicle to which the present invention is adopted.
Figure 3:
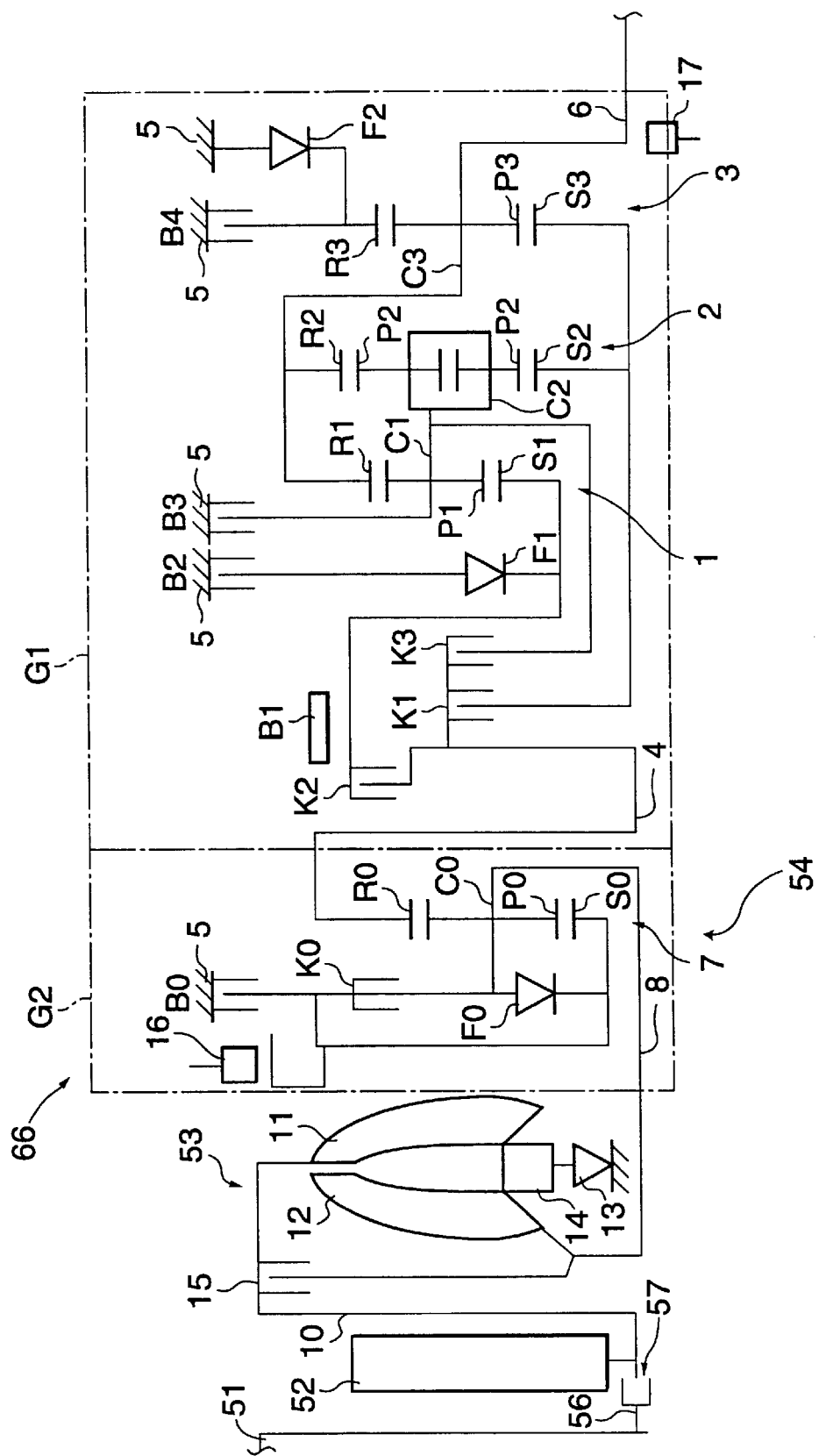
FIG. 3 is a schematic skeleton drawing of a drive train to which the apparatus can be adopted.

In the following description and the accompanying drawings, the present invention will be described in more detail in terms of specific embodiments. FIG. 2 is a schematic view showing a part of a power train for a hybrid vehicle as one example to which the present invention is adopted. FIG. 3 is a schematic skeleton drawing of a drive train to which the apparatus can be adopted. In FIG. 2, a power train for a front engine rear drive type is shown. That is, an internal combustion engine (one example as a first power source) 51 is mounted in the front of the vehicle, and an electric motor (one example as a second power source) 52 is connected to the engine 51 at the output side of the engine 51. The electric motor 52, here, has not only a function of motor but also a function of generator. An automatic transmission 54 is provided at the output side of the electric motor 52. The automatic transmission 54 includes a torque converter 53 and a gear device 66. A torque is transmitted from the automatic transmission 54 to wheels 6A (in this case they are rear wheels). Consequently, at least one of torque from the engine 51 and the electric motor 52 can be transmitted to the wheels 6A. It is also available that the present invention is adopted to other types, for example a front engine front drive, four wheel drive, or etc.

The internal combustion engine 51 outputs torque by burning fuel. One of a gasoline engine, a diesel engine, a LPG (Liquefied Petroleum Gas) engine, etc. can be adopted to the internal combustion engine 51. A turbine type of engine is also available, other than the aforementioned reciprocating type of engines. The engine 51 is electrically controlled by a throttle angle of an electric throttle valve 55, a fuel amount injected by a fuel injector, an ignition timing, or etc.

The electric motor 52 outputs torque by receiving electric power, and a direct current type motor or an alternating current type motor can be adopted. Furthermore, a fixed permanent magnet type synchronous motor can be also adopted.

An input clutch 57 is provided in a torque transmitting course between a crank shaft 56 of the engine 51 and the torque converter 53. The input clutch 57 includes clutch disks, a clutch plate, a clutch piston, a hydraulic cylinder, etc.

Furthermore, an electric motor 59 (hereinafter called sub-motor 59) is connected to the crank shaft 56 by way of a driving device 58. The sub-motor 59 has a function for transmitting power to the engine 51, a function for driving auxiliary equipment (an air conditioning compressor or etc.), and a function for generating electric power by being driven by the engine 51. The driving device 58 has a reduction gear (not shown in the drawings). This reduction gear has a planetary gear, a friction engaging device, a one-way clutch, etc. The driving device 58 includes a clutch for engaging or disengaging a power transmitting course between the engine 51 and the sub-motor 59. The sub-motor 59 can function as a starter for starting the engine 51.

A fuel cell system 60 and a battery system (also simply called battery) 61 are provided for supplying electric power to the electric motor 52 and the sub-motor 59. The fuel cell system 60 is an electrochemical type electricity generating system and has a fuel cell 60A, a reformer (not shown), an inverter (not shown), etc. The fuel cell 60A comprises a fuel electrode, an oxygen electrode, and an electrolyte membrane, and the fuel cell 60A generates electric power. The reformer reforms gasoline, methanol, or natural gas to a hydrogen gas and supplies the hydrogen to the fuel cell 60A. The inverter converts a direct current from the fuel cell 60A to an alternating current.

The battery system (hereinafter called battery) 61 has a battery and an inverter (not shown). The battery stores electric energy converted from chemical energy.

The fuel cell system 60 and the battery 61 are connected to the electric motor 52 in parallel. They are also connected to the sub-motor 59 in parallel. A switch 62 connects the electric motor 52 to the fuel cell system 60 or connects the electric motor 52 to the battery 61. In the same way, a switch 63 connects the sub-motor 59 to the fuel cell system 60 or connects the sub-motor 59 to the battery 61.

Consequently, either one of electric power of the fuel cell system 60 and the battery 61 can be supplied to the electric motor 52 by switching the switch 62. In the same way, either one of electric power of the fuel cell system 60 and the battery 61 can be supplied to the sub-motor 59 by switching the switch 63. When the electric motor 52 or the sub-motor 59 generates electric power, the electric power is charged to the battery 61 by switching the switches 62 or 63.

Furthermore, a battery 64 is provided, and the battery 64 is connected to the fuel cell system 60 and the battery 61 by way of a DC-DC converter 65. The battery 64 can be charged by converting a voltage of the fuel cell system 60 or the battery 61.

The electric power of the battery 64 is used for small electric power loads, for example an ECU (=Electric Control Unit, later described in more details).

One example of the automatic transmission 54 is explained using FIG. 3. As mentioned above, this automatic transmission 54 comprises the torque converter 53 and the gear device 66. The gear device 66 comprises a main-transmitting device G1 and a sub-transmitting device G2. The main-transmitting device G1 has two sets of single-pinion type planetary gears, one set of double-pinion type planetary gear, and a plurality of friction engaging means. The sub-transmitting device G2 has a single-pinion type planetary gear and a plurality of friction engaging means. In the automatic transmission 54, six forward shift gears and one reverse shift gear can be set by this structure and by engaging or disengaging the friction engaging means.

First, the above-mentioned main-transmitting device G1 is described. A first planetary gear 1 is a single-pinion type planetary gear having a sun gear S1, a ring gear R1, and a carrier C1. The carrier C1 comprises a plurality of pinions P1. The sun gear S1 rotates at the center circle of the first planetary gear 1 and engages the pinions P1. The ring gear R1 rotates at the outer circle of the first planetary gear 1. The pinions P1 are disposed between the sun gear S1 and the ring gear R1. The pinions P1 rotate while moving along the outer circumference of the sun gear S1. The carrier C1 supports a rotational shaft of each pinion P1.

In the same way, a second planetary gear 2 is a double-pinion type planetary gear having a sun gear S2, a ring gear R2, and a carrier C2. The carrier C2 comprises a plurality of pinions P2. The pinions P2, here, are different from the aforementioned pinions P1. The pinions P2 comprise a double set of pinions. Each pinion of one set of pinions respectively engages each pinion of another set of pinions. The sun gear S2 rotates at the center circle of the second planetary gear 2 and engages the pinions P2. The ring gear R2 rotates at the outer circle of the second planetary gear 2. Two sets of pinions P2 are disposed between the sun gear S2 and the ring gear R2. The pinions P2 rotate while moving along the outer circumference of the sun gear S2. The carrier C2 supports a rotational shaft of each pinion P2.

Furthermore, a third planetary gear 3 is a single-pinion type planetary gear having a sun gear S3, a ring gear R3, and a carrier C3. The carrier C3 comprises a plurality of pinions P3. The sun gear S3 rotates at the center circle of the planetary gear 3 and engages the pinions P3. The ring gear R3 rotates at the outer circle of the third planetary gear 3. The pinions P3 are disposed between the sun gear S3 and the ring gear R3. The pinions P3 rotate while moving along the outer circumference of the sun gear S3. The carrier C3 supports a rotational shaft of each pinion P3.

The rotating members of the planetary gears 1, 2, and 3 are connected together as follows. The planetary gears 1, 2, and 3 are co-axially disposed in order of 1, 2, and 3. The carrier C1 of the first planetary gear 1 is coupled to the carrier C2 of the second planetary gear 2, and they rotate as one body. The ring gear R1 of the first planetary gear 1 is coupled to the ring gear R2 of the second planetary gear 2, and the ring gear R2 is coupled to the carrier C3 of the third planetary gear 3. All three of these members, R1, R2, and C3, rotate as one body. Furthermore, the sun gear S2 of the second planetary gear 2 is coupled to the sun gear S3 of the third planetary gear 3, and they rotate as one body.

Next, friction engaging means in the main-transmitting device G1 are explained. An intermediate shaft 4 as a hollow or solid shaft is deposited coaxial to the first planetary gear 1 in front of the first planetary gear 1. The intermediate shaft 4 is selectively connected to the sun gears S2 and S3 by engagement of a first clutch K1. The intermediate shaft 4 is selectively connected to the sun gear S1 of the first planetary gear 1 by engagement of a second clutch K2.

Furthermore, the intermediate shaft 4 is selectively connected to the carrier C1 of the first planetary gear 1 and the carrier C2 of the second planetary gear 2 by engagement of a third clutch K3. These clutches K1, K2, K3 are required to have a capacity for transmitting torque selectively. A multi-plate clutch by engaging or disengaging oil pressure, a dry type single plate clutch, or a one-way clutch is adequately adopted to each above-mentioned clutch.

A first brake B1 is provided for selectively stopping the rotation of the sun gear S1 of the first planetary gear 1. A one-way clutch F1 is deposited between the sun gear S1 and a second brake B2 having a plurality of plates, and the one-way clutch F1 prevents the sun gear S1 from rotating in a predetermined direction. The second brake B2 is fixed by a fixing part 5 (for instance, a casing of the automatic transmission). A third brake B3 is deposited between the carrier C1 of the first planetary gear 1 and the fixing part 5. The third brake B3, having a plurality of plates, selectively stops a rotation of the carriers C1 and C2 which are coupled together.

Furthermore, a fourth brake B4 is deposited between the ring gear R3 of the third planetary gear 3 and the fixing part 5. The fourth brake B4, also having multiple plates, selectively stops a rotation of the ring gear R3. A one-way clutch F2 is provided in parallel with the fourth brake B4, and the one-way clutch F2 prevents the ring gear R3 from rotating in a predetermined direction. An output shaft 6 is coupled to the carrier C3 of the third planetary gear 3 in order to rotate as one body.

Next, the sub-transmitting device G2 comprises one set of a single pinion type planetary gear 7, and two conditions of high and low gears can be set by the sub-transmitting device G2. That is, a carrier C0 is an input member, and an input shaft 8 is connected to the carrier C0. A multi-plate clutch K0 and a one-way clutch F0 are deposited in parallel together, between a sun gear S0 and a carrier C0. The carrier C0 supports pinions P0 which engages the sun gear S0 and rotates while moving along the outer circumference of the sun gear S0. The one-way clutch F0 engages, when the sun gear S0 is about to relatively rotate against the carrier C0 in the normal direction. Furthermore, a brake B0 having a plurality of plates is deposited between the sun gear S0 and the fixing part 5. The brake B0 selectively stops the sun gear S0 from rotating. A ring gear R0 is coupled to the intermediate shaft 4 included in the main-transmitting device G1.

The torque converter 53 with a lock-up clutch 15 is provided in the input side of the sub-transmitting device G2. This torque converter 53 is a conventional type and forms a sealed-up container with a front cover 10, a shell of a pump impeller 11, and a turbine runner 12. The pump impeller 11 contains oil (automatic transmission oil, also called AT fluid). In the container, the turbine runner 12 is deposited facing the pump impeller 11, and the turbine runner 12 is connected to the above-mentioned input shaft 8 as one body.

Furthermore, a stator 14 which is held by a one-way clutch 13 is deposited in the rotating center circle of the torque converter 53 between the pump impeller 11 and the turbine runner 12. The lock-up clutch 15 is deposited facing the inner face of the front cover 10, and the lock-up clutch 15 can be engaged by contacting the front cover 10 or disengaged by being apart from the front cover 10. The lock-up clutch 15 directly connects the pump impeller 11 to the turbine runner 12. That is, when the lock-up clutch 15 engages, the pump impeller 11 and the turbine runner 12 rotate as one body.

Incidentally, a turbine rotation speed sensor 16 is provided for detecting a speed of the turbine runner 12 as an input rotation speed of the automatic transmission 54, and an output rotation speed sensor 17 is provided for detecting an output speed of the automatic transmission 54 as a vehicle speed.

In the above-mentioned automatic transmission 54, a gear shift is automatically controlled based on an engine load or a driving condition of the vehicle, and the gear shift is also controlled based on a driver's manual shift. The engine load is detected by an acceleration angle or a throttle angle. The driving condition is detected by a turbine rotation speed or a vehicle speed. That is, an oil pressure control device 67 is provided for electrically controlling supply or release of the oil pressure. A shift device 68 is provided for selecting a shift position. The shift device 68 is not only mechanically connected to valves including a manual valve, but a switch or a sensor attached to the shift device 68 is also electrically connected to the ECU 70. Consequently, a supplying route of the oil pressure in the automatic transmission 54 is changed when the shift position of the shift device 68 is changed.

The gear shift of the automatic transmission 54 is controlled by controlling the oil pressure control device 67 by signals outputted by the ECU 70. The ECU 70 mainly comprises micro-computers, same as a conventional electric control unit. The ECU 70 determines the shift gear on the basis of input signals indicating the driving condition (a vehicle speed, an acceleration angle, a throttle angle, or etc.) and a shift pattern (also called a shift map) which is memorized in advance. Furthermore, the ECU 70 controls engagement/disengagement or half engagement of the lock-up clutch 15. Half engagement, here, means a condition where clutch plates of a lock-up clutch slips and the lock-up clutch engages insufficiently.

In the shift device 68, one of a neutral position, a driving position, a reverse position, etc. can be selected. When a forward driving position is selected in the shift device 68, each shift gear of the automatic transmission 54 is determined by supply or release of the oil pressure to the aforementioned friction engaging means by way of the oil pressure control device 67, based on the output signal of the ECU 70. D (Drive) position, P (Park) position in which the vehicle stops, R (Reverse) position in which the vehicle runs in the reverse direction, N (Neutral) position, etc. are selected by the shift device 68. The supply or release of each friction engaging means controlled by the ECU 70 is shown in FIG. 4.

In FIG. 4, P, R, or N indicates a park, reverse, or neutral position selected by the shift device 68. Each gear from $1^{st}$ through $6^{th}$ is determined when the forward driving position is set. ⊚ shows an engaged condition of each friction engaging means, ○ shows an engaged condition during engine braking, and Δ shows an engaged condition where no power is transmitted. Each vacant space shows a disengaged condition.

As shown in FIG. 4, six forward shift gears can be set in the automatic transmission 54. Each gear from $1^{st}$ until $4^{th}$ gear, and $6^{th}$ gear is set by engaging the clutch K0 of the sub-transmitting device G2 (This condition is the low gear of the sub-transmitting device G2 and also a direct connection between the input shaft 8 and the intermediate shaft 4.) and by engaging or disengaging each friction engaging means of the main-transmitting device G1. $5^{th}$ gear is set by the direct connection of the G1 where the whole members of the main-transmitting device G1 rotates as one body, and by the condition where G2 is set as the high gear. Each gear ratio of $5^{th}$ gear and $6^{th}$ gear is less than 1, and such a condition of $5^{th}$ or $6^{th}$ gear is called an overdrive gear.

That is, in this case, at least one overdrive gear which has a gear ratio, less than 1, can be set in the forward gears. Furthermore, the automatic transmission 54, which has six forward gears, has two overdrive gears.

Figures 5, 6:
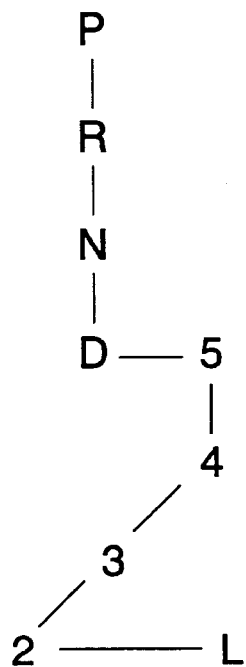
FIG. 5 is a schematic drawing showing one example of each shift position of a shift device for the automatic transmission.
FIG. 6 is a diagram showing shift gears available in each shift position for the automatic transmission.

Shift positions selected by operating the shift device 68 are shown in FIG. 5. Here, the upper side in FIG. 5 is the front of a vehicle or the upper side of the vehicle. P (Park), R (Reverse), N (Neutral), and D (Drive) positions are disposed in a row in order as shown in FIG. 5. "5" position is located adjacent to D position in the width direction of the vehicle. "4" position is deposited in the rear direction of the vehicle or downwards toward "5" position. "3" and "2" positions are located in order in the diagonally rear or diagonally downwards toward "4" position. L position is provided adjacent to "2" position in the transverse direction of the vehicle.

Each shift position is for selecting each shift range which has selectable shift. Each shift range corresponding to each position are shown in FIG. 6. D position is set by moving a shift lever of the shift device 68 to D, and selectable shift gears in D position are six gears from $1^{st}$ to $6^{th}$ gear. One gear from $1^{st}$ to $4^{th}$ gear can be available in "4" position. One gear from $1^{st}$ gear to $3^{rd}$ gear is available in "3" position. $1^{st}$ and $2^{nd}$ gear are selectable in "2" position. In L position, only $1^{st}$ gear is set.

A shift gear which can be set in each position is determined by the ECU 70 on the basis of a driving condition such as an engine load or a vehicle speed, and a gear shift to a suitable gear is executed. In the above-mentioned way, when the shift lever 68 is fixed to each position, a suitable gear is selected automatically according to the driving condition of the vehicle.

Torque can be transmitted from the input shaft 8 to the output shaft 6 in the automatic transmission when D, "5", "4", "3","2",L , or R position is selected. Each above-mentioned position belongs to a driving position. On the contrary, torque can not be transmitted from the input shaft 8 to the output shaft 6, when N or P position is set. Either position belong to a non-driving position.

In the automatic transmission 54, an oil pump 71 which is mechanically driven and an oil pump 72 which is electrically driven are provided for generating an oil pressure for supplying to each friction means, the lock-up clutch 15, or for lubrication of the automatic transmission 54. The oil pump 71 is deposited between the torque converter 53 and the gear shift device 66, and it is driven by the engine 51 or/and the electric motor 52. The oil pump 72 is driven by en electric motor (not shown) and assists the oil pump 71.

Figure 7:
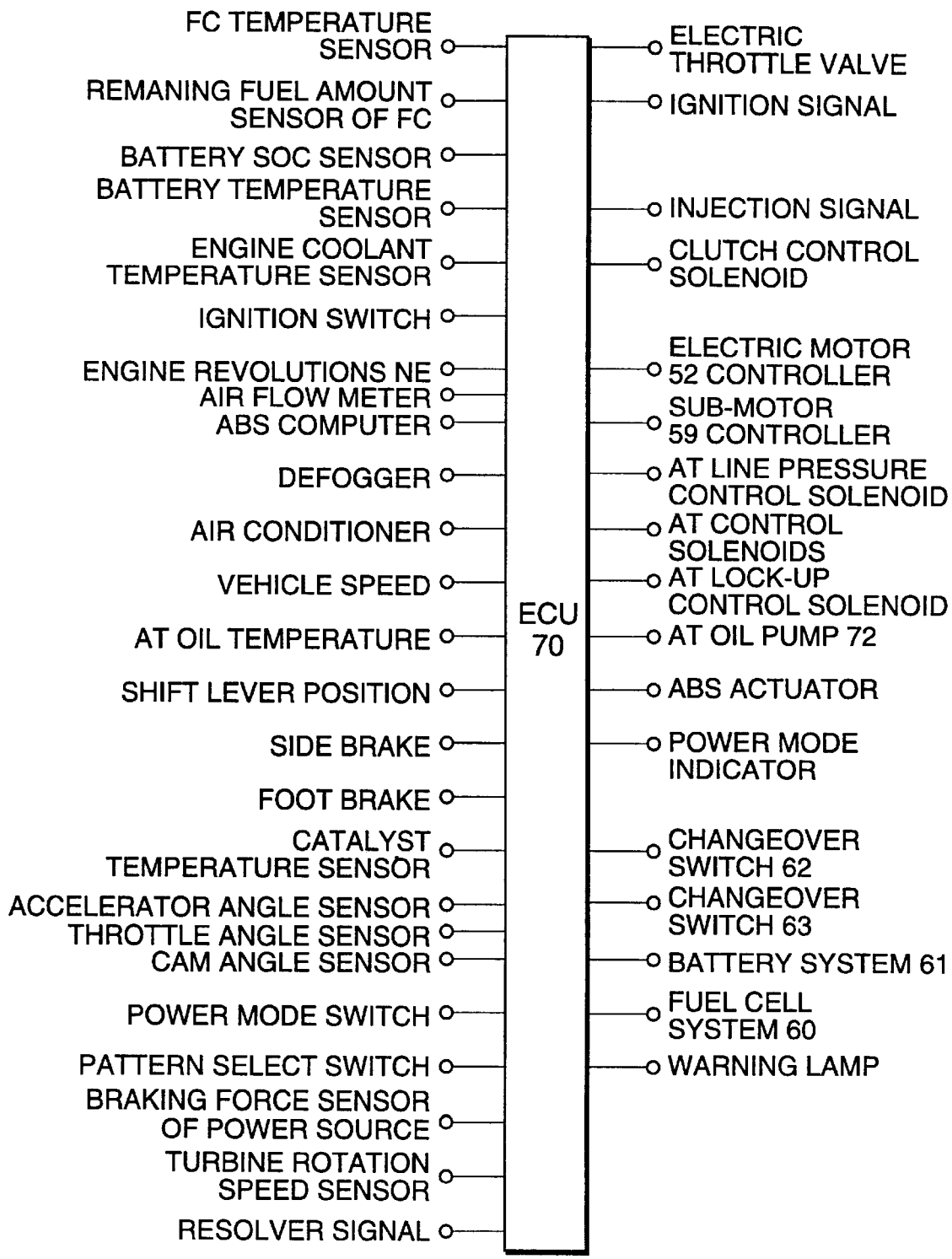
FIG. 7 is a block diagram showing input signals to and output signals from an ECU (Electric Control Unit) for the apparatus.

Sensors or parts, which output signals to the ECU 70 or receive signals from the ECU, are shown in FIG. 7. The ECU 70 receives the following signals in order to control the gear shift at each shift position: a signal from a temperature sensor of the fuel cell system (FC) 60, a signal from a remaining fuel amount sensor of the fuel cell 60A, a signal from a state of charge (SOC) sensor of the battery 61, a signal from a temperature sensor of the battery 61, a signal from a temperature sensor of engine coolant, a signal from an ignition switch, a signal of the engine revolutions NE, a signal from an air flow meter, a signal from an ABS (Anti-lock Brake System) computer, a signal from a defogger, a signal from an air conditioner, a signal of a vehicle speed, a signal of a temperature of the automatic transmission oil, a signal of the shift lever position, an on-off signal of a side brake, an on-off signal of a foot brake, a signal from a catalyst temperature sensor, a signal from an accelerator angle sensor, a signal from a throttle angle sensor, a signal from a cam angle sensor, a signal from a power mode (or sports mode) switch, a signal from a pattern select switch, a signal from a braking force sensor of the power source, a signal from a turbine rotation speed sensor, and a signal from a resolver which detects a rotation speed and a rotation angle of the electric motor 52, etc.

From the ECU 70 the following signals are outputted: a signal to the electric throttle valve 55, a signal to an ignition system, a signal to an injection system, a signal to a clutch control solenoid for controlling the input clutch 57, a signal to a controller of the electric motor 52, a signal to a controller of the sub-motor 59, a signal to a solenoid for controlling the automatic transmission line pressure, a signal to solenoids for controlling the automatic transmission 54, a signal to a solenoid for controlling the lock-up clutch 15, a signal to the oil pump 72, a signal to actuators of the ABS, a signal to a power mode indicator, signals to changeover switches 62, 63, a signal to the battery 61, a signal to the fuel cell system 60, and a signal to a warning lamp.

Suitable solenoids work by some of the above-mentioned signals, and the input clutch 57, the electric motor 52, the sub-motor 59, and the automatic transmission 54 are controlled based on a driving condition (ex. the vehicle speed or the accelerator angle) and a driver's operation.

Figure 1:
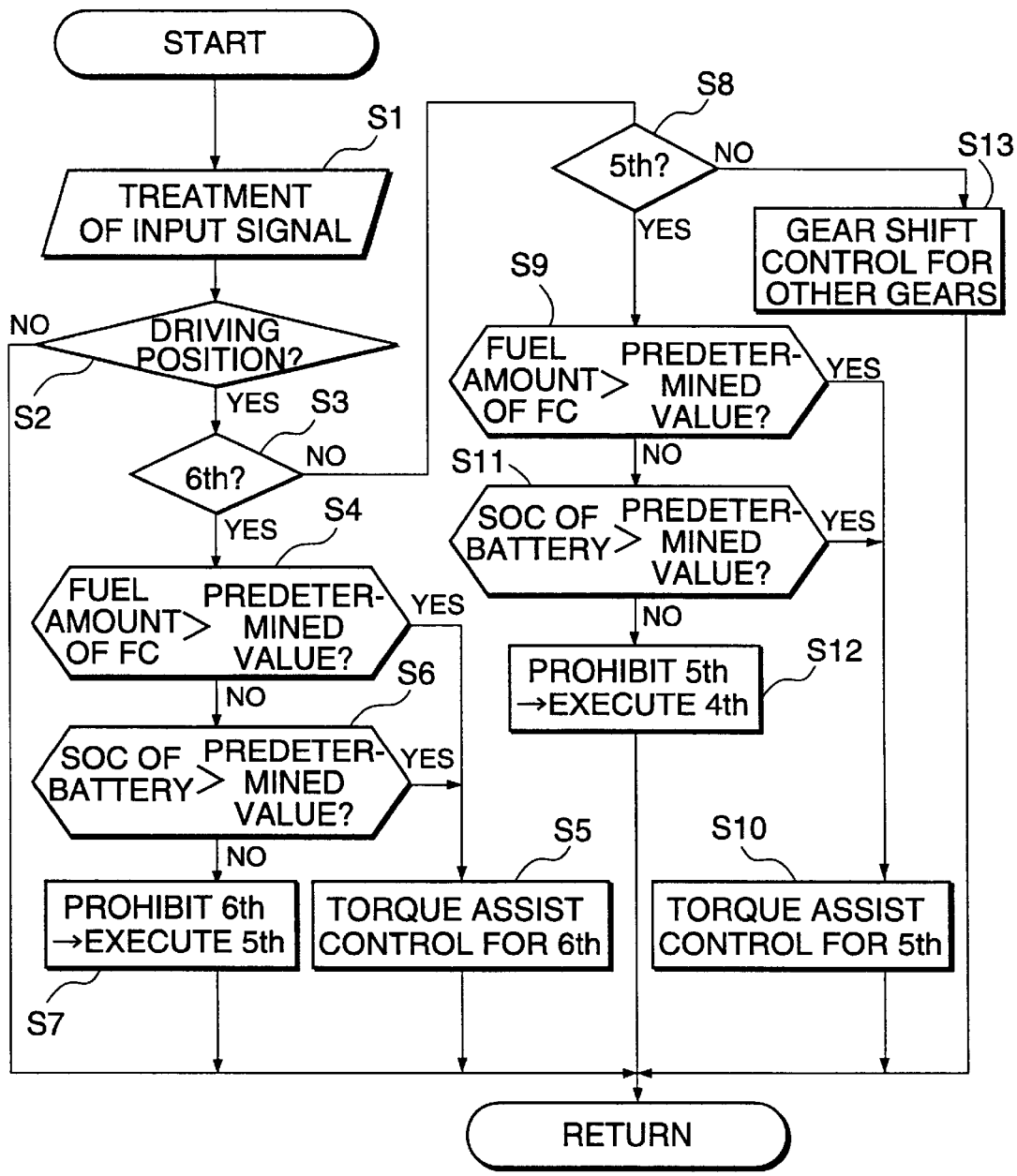
FIG. 1 is a flowchart which explains one example of an apparatus for controlling a vehicle as a first embodiment of the present invention.
Figure 8:
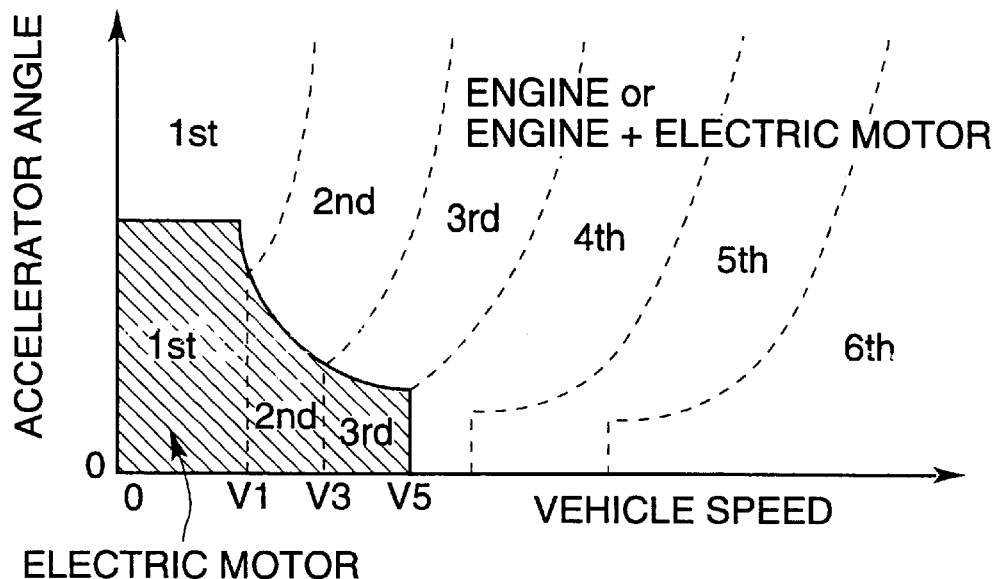
FIG. 8 is a diagram showing a map of shift gears in D position and a selection of an internal combustion engine and/or an electric motor in the hybrid vehicle.
Figure 9:
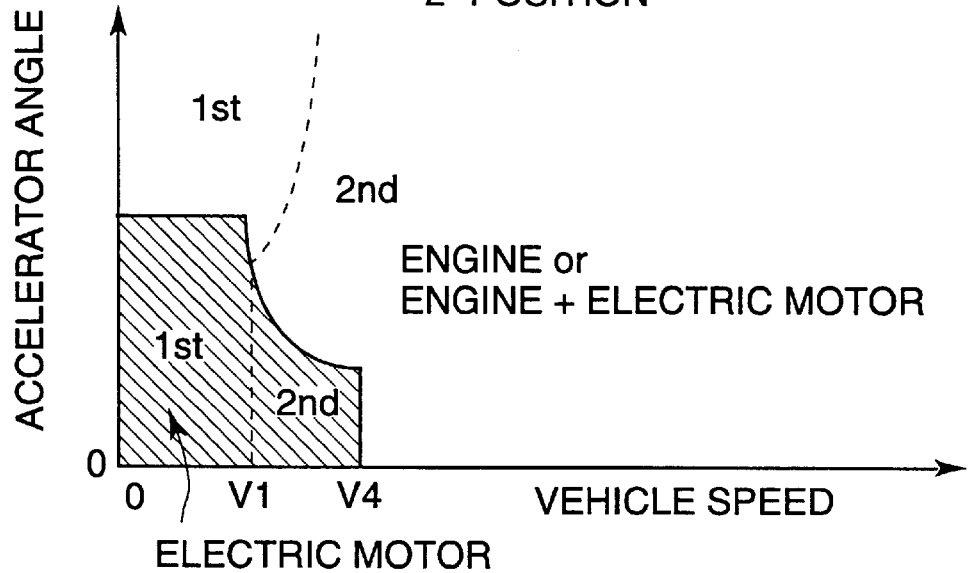
FIG. 9 is a diagram showing a map of shift gears in "2" position and a selection of an internal combustion engine and/or an electric motor in the hybrid vehicle.

Next, an example of the control of the present invention as the first embodiment is described using FIG. 1. First, a treatment of the input signals is executed in the ECU 70 in the step S1 (hereinafter called S1). A driving or a stopping of the electric motor 52 and the gear ratio of the automatic transmission 54 is controlled on the basis of predetermined data and the inputted signals, as shown in FIGS. 8 and 9. In FIG. 8, a diagram of a map of shift gears in D position and a selection of the engine 51 and the electric motor 52 is shown. In FIG. 9, diagram of a map of shift gears in "2" position and a selection of the engine 51 and the electric motor 52 is shown. In the maps of shift gears, a driving condition of the vehicle, that is the vehicle speed and the accelerator angle, are parameters. An electric motor zone and an engine + electric motor zone are set, as shown by a boundary line of the solid lines in FIGS. 8 and 9. In the engine + electric motor zone, the engine 51 works or both of the engine 51 and the electric motor 52 work. Shifting points of the automatic transmission 54 are shown by boundary lines of the dashed lines.

In FIG. 8, the electric motor zone is set in the field in which the vehicle speed is equal to or less than V5 and in which the accelerator angle is equal to or less than a predetermined value. The engine + electric motor zone is set in the field other than the above-mentioned electric motor zone. In the electric motor zone, a gear from $1^{st}$ to $3^{rd}$ gear can be controlled. That is, $1^{st}$ gear is set in the field in which the vehicle speed is from zero to V1. $2^{nd}$ gear is set in the field between V1 and V3 of the vehicle speed. $3^{rd}$ gear is set in the field between the vehicle speed V3 and V5. Incidentally, the vehicle speed V5 is higher than V3, and V3 is higher than V1. On the other hand, one shift gear from $1^{st}$ to $6^{th}$ gear can be controlled in the engine + electric motor zone.

In the shift map of FIG. 9, the electric motor zone is set in the field where the vehicle speed is equal to or less than V4, and where the accelerator angle is equal to or less than a predetermined value. In the same way as FIG. 8, the engine + electric motor zone is set in the field other than the above-mentioned electric motor zone. In the electric motor zone, $1^{st}$ gear or $2^{nd}$ gear can be set. That is, $1^{st}$ gear is set in the field between zero and V1 of the vehicle speed. $2^{nd}$ gear is set between V1 and V4. Incidentally, the vehicle speed V4 is higher than V3, and V4 is lower than V5. One shift gear among $1^{st}$ and $2^{nd}$ gears is selected in the engine + electric motor zone.

Figure 10:
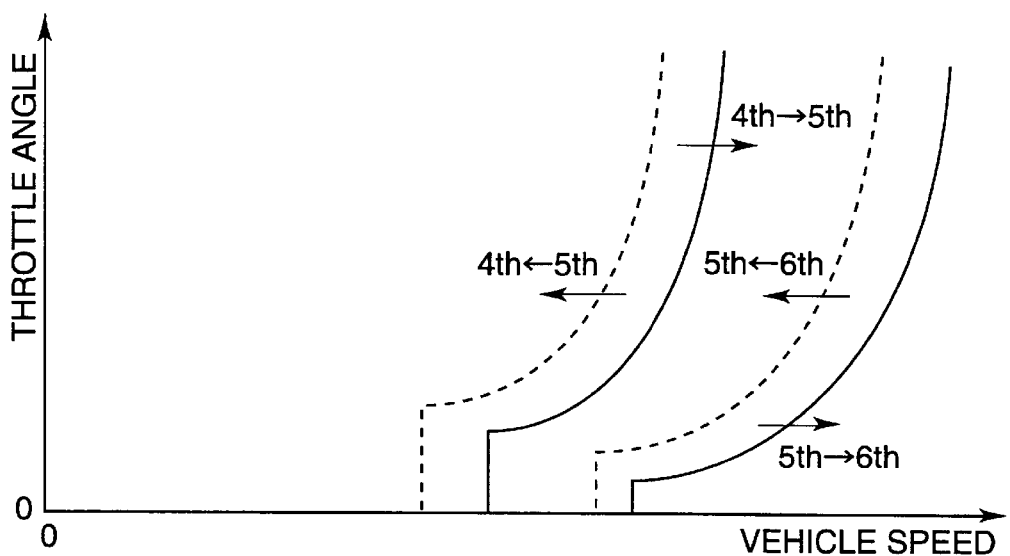
FIG. 10 is a diagram showing a part of a shift pattern map for setting up-shifts from $4^{th}$ to $5^{th}$ gear or from $5^{th}$ to $6^{th}$ gear, and for setting down-shifts from $5^{th}$ to $4^{th}$ gear or from $6^{th}$ to $5^{th}$ gear.

It is also available that the gear shift of the automatic transmission 54 is controlled on the basis of the treatment of the input signals in S1, as shown by the shift map in FIG. 10. The automatic transmission 54 is controlled by the vehicle speed and the throttle angle as parameters. Up-shift lines and down-shift lines between $4^{nd}$ and $5^{th}$ gears and between $5^{th}$ and $6^{th}$ gears are shown. The up-shift lines are shown by the solid lines, and the down-shift lines are shown by the dashed lines. The up-shift line from $5^{th}$ to $6^{th}$ gear is set in the higher vehicle speed side than the up-shift line from $4^{th}$ to $5^{th}$ gear. The down-shift line from $5^{th}$ to $4^{th}$ gear is set in the lower vehicle speed side than the down-shift line from $6^{th}$ to $5^{th}$ gear.

Figure 11:
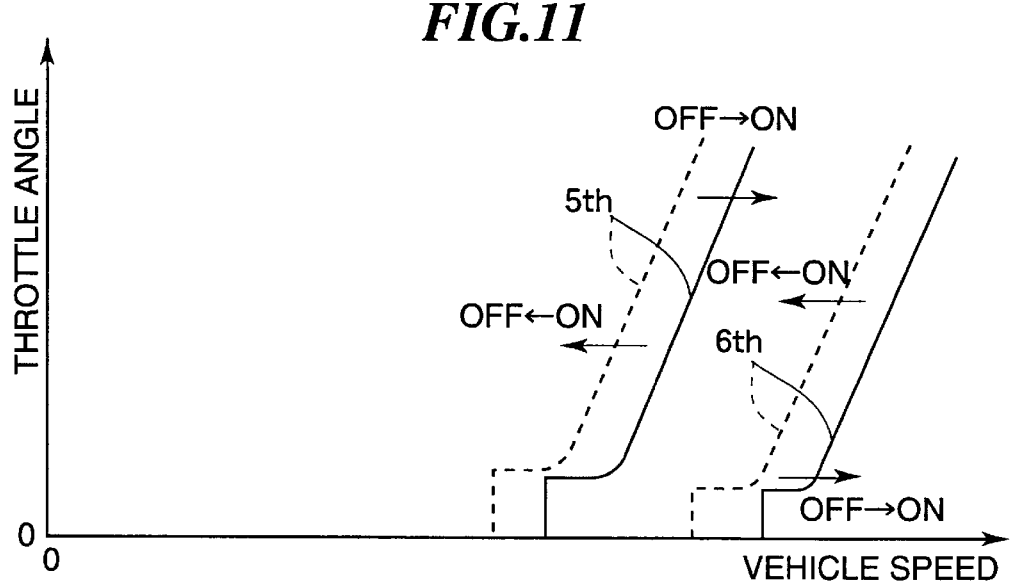
FIG. 11 is a diagram showing a part of a lock-up pattern map for $5^{th}$ or $6^{th}$ ; gear.

Furthermore, on the basis of the treatment of input signals in S1, an engagement or disengagement of the lock-up clutch 15 can be controlled. FIG. 11 is a diagram showing a lock-up pattern map for controlling the engagement (ON) or disengagement (OFF) of the lock-up clutch 15 when the automatic transmission 54 is in $5^{th}$ or $6^{th}$ gear. That is, the solid lines show that the lock-up clutch 15 is changed from the disengagement (OFF) to the engagement (ON), and the dashed lines show that the lock-up clutch 15 is changed from the engagement (ON) to the disengagement (OFF). Each solid line is set in the higher vehicle speed side than the corresponding dashed line for $5^{th}$ or $6^{th}$ gear.

The solid line for $6^{th}$ gear is in the higher vehicle speed than one for $5^{th}$ gear. In the same way, the dashed line for $6^{th}$ gear is in the higher vehicle speed than one for $5^{th}$ gear. When the vehicle condition crosses over one of the above-mentioned lines with the automatic transmission 54 in $5^{th}$ or $6^{th}$ gear, the lock-up clutch 15 is engaged or disengaged.

Next, whether the driving position is selected or not in the shift device 68 is determined in S2. When "no" is determined in S2, the routine directly returns. When "yes" is determined in S2, the control transitions to S3. In S3, whether the automatic transmission 54 is in $6^{th}$ gear or not is determined. As shown in FIG. 6, $6^{th}$ gear is only permitted in D position. The zone of $6^{th}$ gear is set when the vehicle speed is high and the throttle angle (or the accelerator angle) is low. Consequently, the engine revolutions are restrained low in high speed driving, and the fuel consumption can be improved in high speed driving.

As mentioned above, 6Lh gear is an overdrive gear. Consequently, a margin of the driving force against the resistance force of the vehicle is decreased, when the vehicle is driven only by the engine. $1^{st}$ f the vehicle enters into a slope while the automatic transmission 54 is in $6^{th}$ gear, the automatic transmission 54 tends to easily down-shift because of a slight decrease of the vehicle speed or a slight increase of the engine load which is shown by the throttle angle. Since the margin torque increases after the automatic transmission 54 down-shifts and the vehicle speed increases, the automatic transmission 54 up-shifts. This phenomenon in which up-shifts and downshifts are repeated is called a "busy-shift". $1^{st}$ in the automatic transmission 54, the busy-shift tends to happen frequently. The busy-shift is avoided as follows.

When "yes" is determined in S3, that is the automatic transmission 54 is in $6^{th}$ gear, whether a fuel amount of the fuel cell 60A is more than a predetermined value or not is determined in S4. The predetermined value, here, indicates that such an amount of the fuel can generate an electric power by which torque of the electric motor 52 can assist the engine 51. When "yes" is determined in S4, the electric power of the fuel cell system 60 drives the electric motor 52. The torque assist control (in which the torque of the engine 51 is assisted by the torque of the electric motor 52) is executed in S5. The routine proceeds to RETURN.

Figure 12:
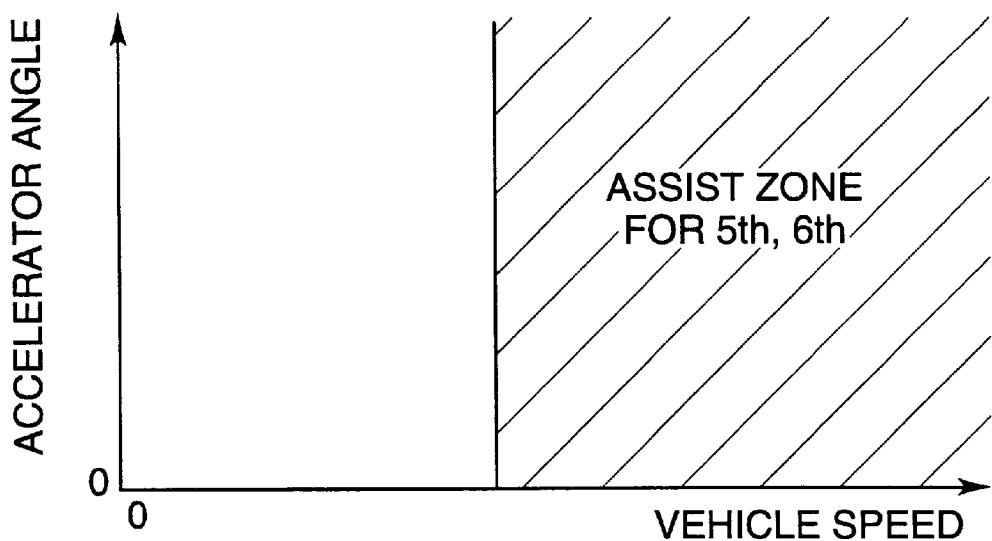
FIG. 12 is a diagram showing an assist zone of the electric motor for $5^{th}$ or $6^{th}$ gear.

FIG. 12 is a diagram showing an assist zone in which the electric motor 52 assists the engine 51. The assist zone is set where the acceleration angle and the vehicle speed are parameters. The assist occurs, as shown by the oblique lines, when the automatic transmission is in $5^{th}$ or $6^{th}$ gear. That is, the electric motor 52 can assist whenever the acceleration angle is low, middle, or high, while the vehicle speed is middle or high.

Figure 13:
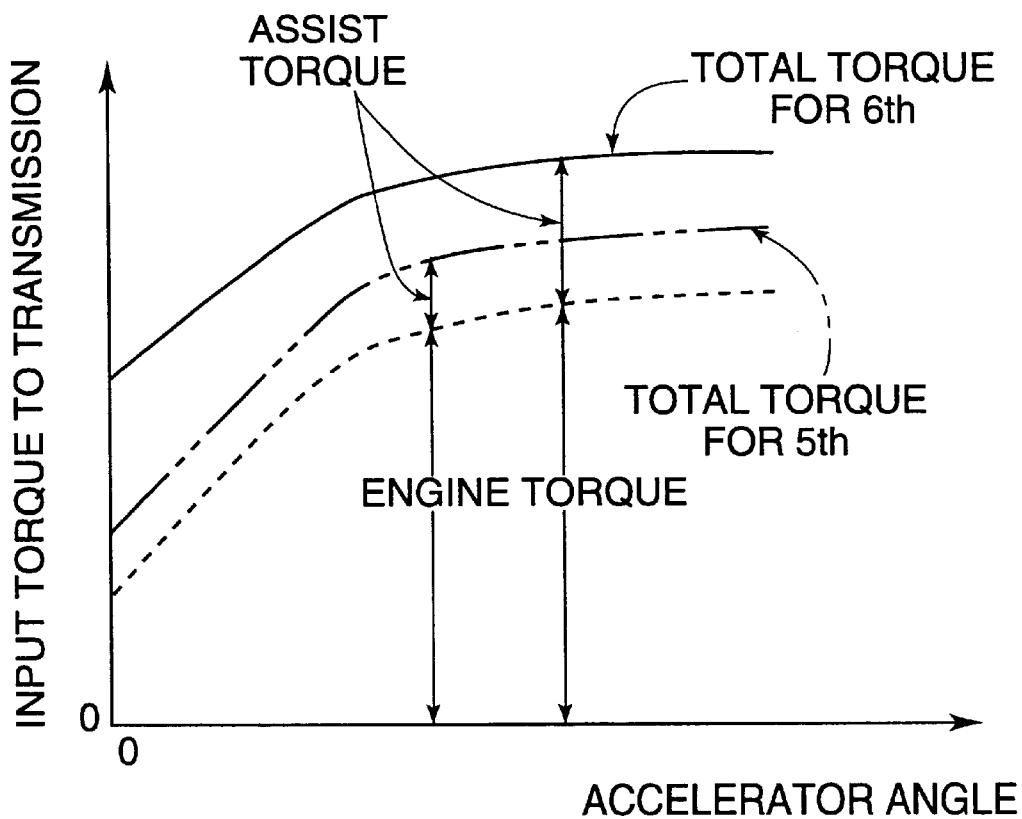
FIG. 13 is a graph showing relations between an accelerator angle and an input torque to the automatic transmission for $5^{th}$ or $^{6}$th gear.

FIG. 13 is a graph showing an assisting characteristic of the electric motor 52 to the engine 51. The vertical line shows input torque to the automatic transmission 54. The dashed line is the torque of the engine 51. The double-dashed line is the total torque integrated by the engine 51 and the electric motor 52 for $5^{th}$ gear, when the electric motor 52 assists the engine 51. The solid line shows the total torque by the engine 51 and the electric motor 52 for $6^{th}$ gear.

As shown in FIG. 13, the assist torque of the electric motor 52 for $6^{th}$ gear is higher than the assist torque for $5^{th}$ gear. This characteristic is more evident in the lower engine revolutions.

On the other hand, when "no" is determined in S4, a state of charge of the battery 61 is higher than a predetermined value or not is determined in S6. When "yes" is determined in S6, the routine proceeds to S5. As mentioned above, the electric motor 52 is driven by the electric power of the battery 61 and the torque assist control is executed in S5.

When "no" is determined in S6, the insufficient torque of the engine 51 for the required acceleration can not be made up by the electric motor 52. Since a margin torque for the resistance of the vehicle is low in this condition, it is difficult for the vehicle to maintain the current speed. Then, the driver depresses an accelerator pedal, and the automatic transmission 54 down-shifts from $6^{th}$ gear. That is, the above-mentioned busy-shift could happen. In order to avoid such a phenomena, $6^{th}$ gear is prohibited, and $5^{th}$ gear is compulsorily set in S7. the torque assist control of the electric motor 52 is not executed. After S7, the routine proceeds to RETURN.

On the other hand, when "no" is determined in S3, whether the automatic transmission 54 is in $5^{th}$ gear or not is determined in S8. When "yes" is determined in S8, the control transitions to S9. In S9, whether the fuel amount of the fuel cell 60A is more than a predetermined value or not is determined. This predetermined value is the same as the predetermined value in S4. When "yes" is determined in S9, the torque of the engine 51 which is insufficient for the required torque is made up by the electric motor 52. That is, the torque assist control of the electric motor 52 for $5^{th}$ gear is executed S10. The routine then proceeds to RETURN.

The torque assist control of the electric motor 52 is done in whole field in $5^{th}$ gear as shown by oblique lines in FIG. 12. The assist torque and the total torque for $5^{th}$ gear are shown in FIG. 13. The higher the accelerator angle is over a predetermined value, the higher the assist torque for $5^{th}$ gear of the electric motor 52 is.

Figure 15:
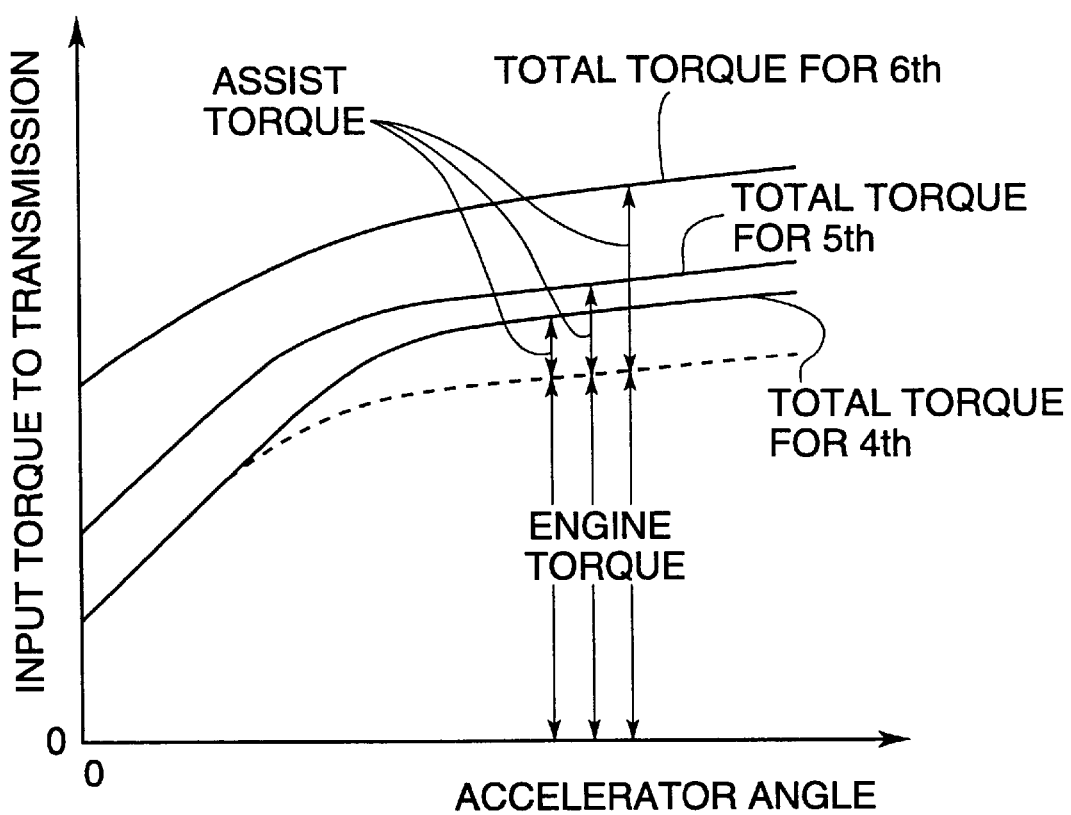
FIG. 15 is a graph showing relations between the accelerator angle and the input torque to the automatic transmission for $4^{th}$ · $5^{th}$ or $6^{th}$ gear.

Incidentally, it is also available that the torque to the engine 51 is assisted by the electric motor 52 not only in $5^{th}$ and $6^{th}$ gears but also in $4^{th}$, $5^{th}$ and $6^{th}$ gears. One example is shown in FIG. 15. In this case, the assist torque for $5^{th}$ gear is higher than the assist torque for $4^{th}$ gear, as shown in FIG. 15. When "no" is determined in S9, whether the state of charge of the battery 61 is over a predetermined value or not is determined in S11. When "yes" is determined in S11, the electric motor 52 is driven by the electric power of the battery 61, and the control in S10 is executed. On the contrary, when "no" is determined in S11, the electric motor 52 can not supply the torque required by the engine 51.

Since a margin torque for the resistance of the vehicle is low in this condition, it is difficult for the vehicle to maintain the current speed. Then the driver depresses the accelerator pedal, and the automatic transmission 54 down-shifts from $5^{th}$ gear. Then the busy-shift could happen. In order to prevent this trouble, the automatic transmission 54 is prohibited to shift to $5^{th}$ gear, and $4^{th}$ gear is set with compulsory in S12. Next, the routine proceeds to RETURN. In S12, the torque assist control of the electric motor 52 is not executed.

Figure 14:
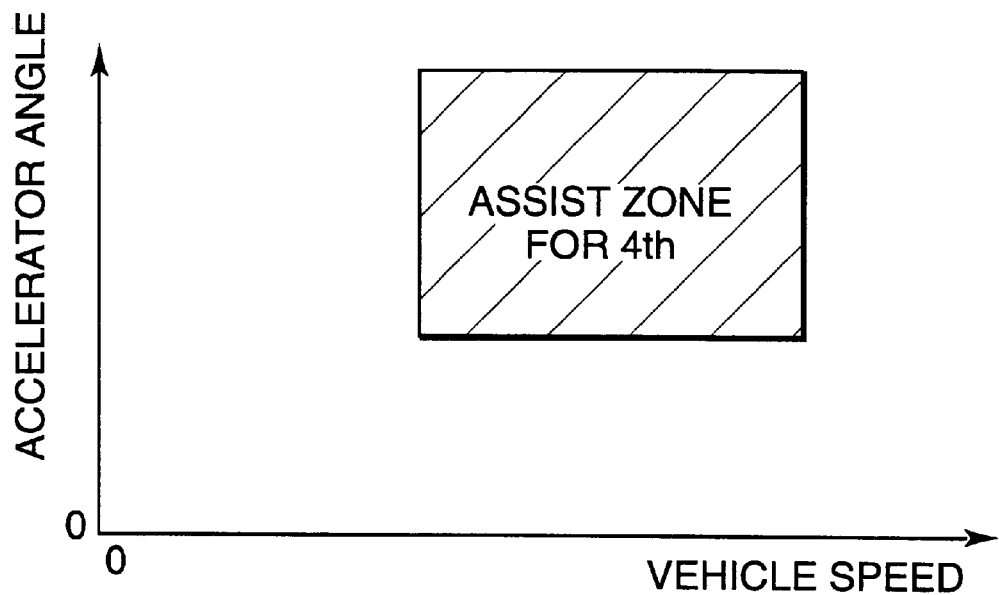
FIG. 14 is a diagram showing an assist zone of the electric motor for $4^{th}$ gear.

When "no" is determined in S8, the gear shift control for the gears except $5^{th}$ and $6^{th}$ gears is executed in S13, and the control jumps to RETURN. For example, in $4^{th}$ gear as shown in FIG. 14, the assist zone as shown by the oblique lines is set. The assist zone for $4^{th}$ gear responds to high and middle accelerator angles. The assist zone for $5^{th}$ and $6^{th}$ gears is different from the assist zone for $4^{th}$ gear from the viewpoint of the vehicle speed and the accelerator angle.

Though the assist torques for $4^{th}$, $5^{th}$, and $6^{th}$ gears are different from each other in this embodiment, it is also available that the same assist torque for the above-mentioned gears is set, or that the assist zones are different only when the accelerator angle is high.

As mentioned above in the first embodiment, the assist torques of the electric motor 52 for $5^{th}$ and $6^{th}$ gears are not the same, and the assist torques for $4^{th}$ and $5^{th}$, gears are not the same. Furthermore, the assist zone for $4^{th}$ gear is different from the assist zone for $5^{th}$ or $6^{th}$ gear. When the automatic transmission 54 up-shifts, a problem in which the driving torque of the vehicle is not sufficient is restrained. Consequently, the driving condition is not easily changed and the busy-shift of the automatic transmission 54 can be avoided. Then, this control prevents the driver from feeling uncomfortable.

Furthermore, since the lower the gear ratio of the automatic transmission 54 is, the higher the torque of the electric motor 52 is, the driving force of the vehicle can be prevented from decreasing when the automatic transmission 54 is shifted to the low gear ratio. Namely, since the lower the gear ratio is, the more the torque is easily supplied by the electric motor 52, the driving force of the vehicle can be prevented from decreasing when the automatic transmission 54 is shifted to the low gear ratio.

As long as the fuel amount of the fuel cell 60A is equal to or over the predetermined value, the fuel cell 60A can supply electric power to the electric motor 52, and the torque assist control can continue. Since if the electric motor 52 can not assist the engine 51, the automatic transmission 54 down-shifts, the driving force of the vehicle can be prevented from decreasing. It can be realized to multiply shift gears of an automatic transmission by the above-mentioned control. Since the engine revolutions are maintained rather low, the fuel economy of the vehicle is improved. Consequently, the improvement of the fuel economy can be compatible with the restraint of the busy-shift of the automatic transmission 54.

Next, a second embodiment of the present invention is described. Though in the first embodiment, the electric motor 52 assists the torque of the engine 51 when the shift gear of the automatic transmission 54 is in $5^{th}$ or $6^{th}$ gear, in the second embodiment, the electric motor 52 assists the torque of the engine 51 when the automatic transmission 54 is in a power mode and does not assist when in a normal mode. Incidentally, it is also available that the above-mentioned torque assist occurs when the automatic transmission 54 is in a sports mode and the assist is not done when in a normal mode. The point which is different from the first embodiment is, here, described.

Figure 16:
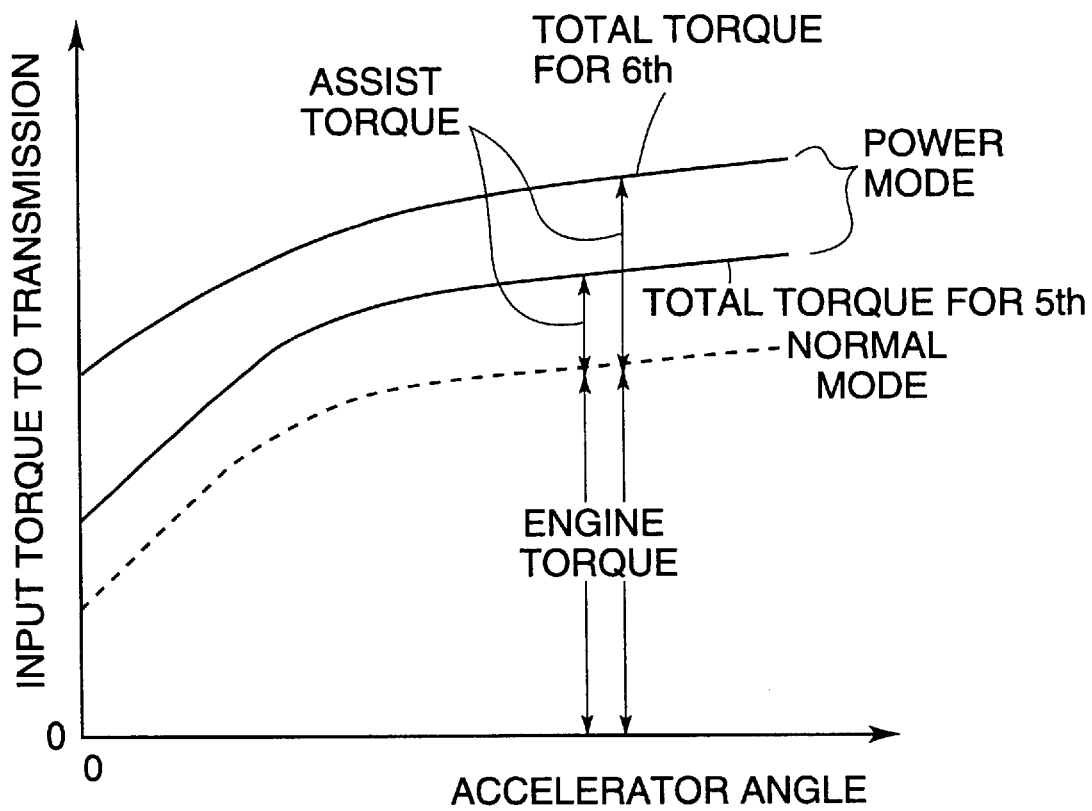
FIG. 16 is a graph showing relations between the accelerator angle and the input torque to the automatic transmission with normal and power modes for $5^{th}$ or $6^{th}$ gear as a second embodiment of the present invention.

As shown in FIG. 16, the assist torque for $6^{th}$ gear of the automatic transmission 54 is higher than the assist torque for $5^{th}$ gear in the power mode. By such a control mentioned above, the busy-shift of the automatic transmission 54 does not happen in $5^{th}$ or $6^{th}$ gear if the driver prefers the power mode, because the total torque of the engine 51 and the electric motor 52 is sufficient for the required torque. Furthermore, even though a displacement of the engine 51 is low, a necessary torque can be secured by the assist of the electric motor 52, if the driver selects the power mode or sports mode. Since the displacement of the engine 51 can be low, the fuel economy improves.

In the second embodiment, it is also available that a slope mode which is suitable for driving on a slope is set in place of the power mode (or the sports mode). If the automatic transmission 54 has the slope mode control, the driver can drive the vehicle smoothly without the busy-shift, when the vehicle enters into a slope.

Next, a third embodiment of the invention is described. The different point from the above-mentioned first and second embodiments is, here, explained. There is a vehicle in which a gasoline engine is mounted, and a control method of improving a thermal ratio and reducing a cooling loss by changing a burning condition of the gasoline engine is adopted in the gasoline engine. In a low load driving, the burning condition is changed to a lean burn condition in the gasoline engine. In the lean burn condition, an air fuel ratio of an intake mixing gas is controlled to be higher than a stoichiometric air fuel ratio.

In the gasoline engine in which the stoichiometric burn condition and the lean burn condition can be changed, the maximum power outputted by the engine in the lean burn condition is lower than the maximum power in the stoichiometric burn condition. In some occasions it might be difficult for the lean burn condition to secure a required torque responding to a driving condition. A driver who drives such a vehicle having the engine with the lean burn condition might feel uncomfortable, when the burning condition is changed and the torque of the engine fluctuates with a step.

The above-mentioned problem can be solved by a torque assist of the electric motor 52 compensating for decreased torque of the engine 51. By the torque assist control of the electric motor 52 in the lean burn condition, a constant output torque can be maintained without regard to the burning conditions.

Figure 17:
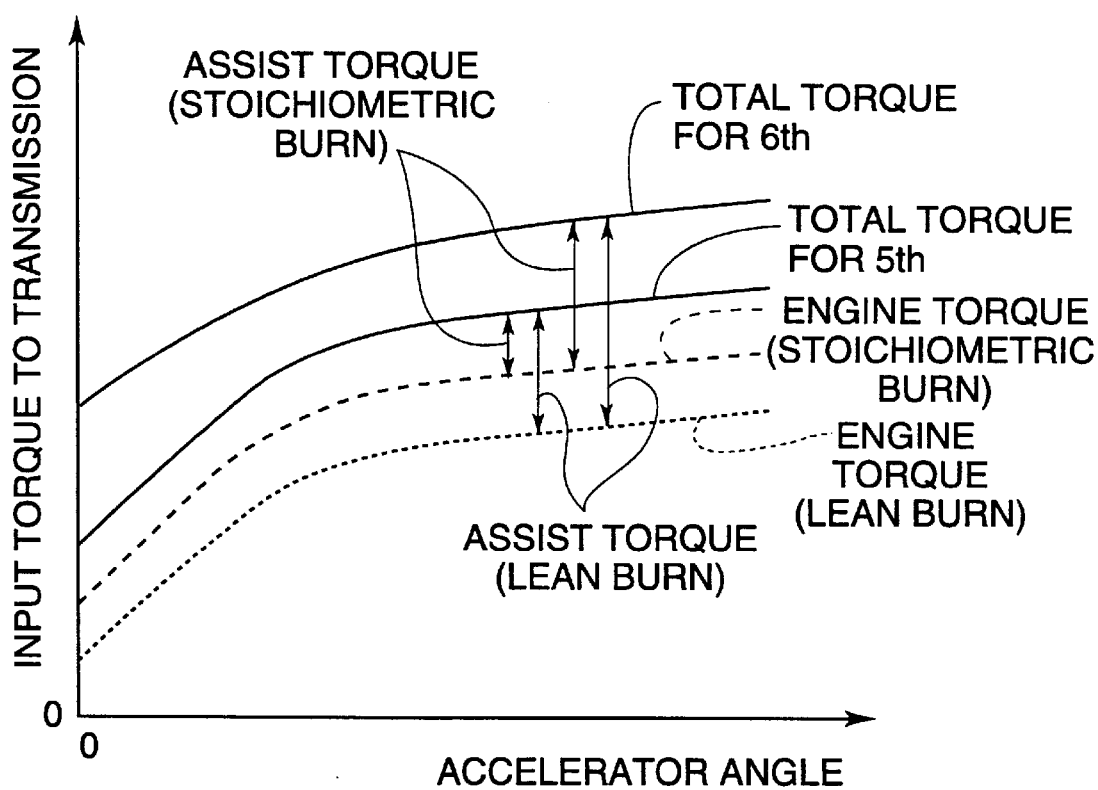
FIG. 17 is a graph showing relations between the accelerator angle and the input torque to the automatic transmission for $5^{th}$ or $6^{th}$ gear as a third embodiment of the present invention.

FIG. 17 shows one example of the assist torque responding to the burning condition. In this case, the torque assist control occurs when the automatic transmission 54 is in $5^{th}$ gear or $6^{th}$ gear. The total torque outputted to the automatic transmission 54 is held constant by increasing the assist torque by a value equal to the decreased value of the engine 51, whether the burning condition is the stoichiometric or lean burn condition.

It is also available that the characteristic of the torque assist control is different from the above-mentioned example. That is, the assist torque for the lean burn condition can be higher than the assist torque in the above-mentioned example.

Furthermore, it is also available that the torque assist control changes among other types of burning conditions, different from whether the burning condition is stichiometric or lean.

Furthermore, it is also available that the torque assist control occurs when the torque from the engine 51 decreases because of other factors, though the torque assist control occurs when the burning condition changes and the outputted torque from the engine 51 decreases in the above-mentioned example. For instance, the output torque decreases in a low atmospheric pressure (ex. at highlands), because an amount of supplied oxygen to the engine 51 decreases. If the atmospheric pressure or the altitude is detected and the torque assist control occurs when the atmospheric pressure is low or the altitude is high, a suitable torque can be secured without regard to the atmospheric pressure or the altitude.

In the above-mentioned embodiments, the output power from the electric motor 52 might be low or fall for several reasons, for example a low state of charge of the fuel cell system 60 or the battery 61. If such a condition occurs, the assist torque of the electric motor 52 is insufficient. The above-mentioned busy-shift, then, might happen. In a fourth embodiment, an apparatus for controlling a vehicle to decrease such an affect to the driving torque by the fuel cell system 60 or the battery 61 is proposed.

In the fourth embodiment, a restraint control is added to the case of the above-mentioned embodiments. The same explanation as mentioned above in the embodiments is omitted, and the added control is described using FIG. 18.

After starting this routine, whether the fuel amount of the fuel cell 60A is less than a predetermined value or not is determined in S100. This step determines whether the fuel amount of the fuel cell 60A is sufficient or not. This predetermined value is set so that the fuel cell 60A can continue to supply the electric power to the electric motor 52 for just a while, though the fuel amount of the fuel cell 60A is low. When "no" is determined in S100, the routine transitions to S110. In S110, whether a temperature of the fuel cell 60A (THFC) is higher than a caution temperature of the fuel cell system 60 (THBi) is determined. THHi is slightly less than an upper limit (THHD) within a permitted range, and THHi is a temperature which should raise a concern.

When "no" is determined in S110, the control proceeds to S120. In S120, whether a temperature of the fuel cell system 60 (THFC) is lower than a lower limit (THLo) within the permitted range or not is determined. That is, whether a warming-up of the fuel cell system 60 is insufficient or sufficient is determined.

When "no" is determined in S120, the routine goes to S130. Whether the system of the apparatus has any disorder or not is determined.

When "no" is determined in S130, that is there is no problem, the control is permitted to change to a control mode in S140. The control mode indicates, here, that the torque assist control is done in $5^{th}$ or $6^{th}$ gear, or in th, $5^{th}$, $6^{th}$ gear, or that $6^{th}$ gear is permitted and in $6^{th}$ gear the torque assist is done. After the step S140, the routine proceeds to RETURN.

On the other hand, when it is determined that the fuel amount is insufficient in S100, the routine transitions to S160. When the temperature of the fuel cell system 60 is over the permitted range, the routine also proceeds to S160 in order to restrain the control mode. Furthermore, it is also available that $6^{th}$ gear is prohibited, adding to the above-mentioned restraint.

Incidentally, even if it is determined that the fuel amount is insufficient or that the temperature of the fuel cell system 60 (THFC) is over the permitted range, there is a case where the electric motor 52 can assist the engine 51 for a while. On the contrary, there is another case where the electric motor 52 should stop assisting the engine 51 instantly.

Even if it is determined that the fuel amount is insufficient, the electric motor 52 can continue to assist the engine 51 as long as a small amount of fuel of the fuel cell 60A remains. However, the electric motor 52 can not assist the engine 51, if the fuel amount is all consumed and the fuel cell system 60 can not generate an electric power.

Furthermore, even if it is determined that the temperature of the fuel cell system 60 (THFC) is over the caution temperature (THHi), the fuel cell system 60 can generate electric power if the temperature of the fuel cell system 60 is less than the upper limit THHD. In this case, it is desirable that the fuel cell system 60 stops generating electric power as soon as possible. When the temperature of the fuel cell system 60 reaches the upper limit THHD, the torque assist of the electric motor 52 can not continue.

$6^{th}$ gear is without a delay prohibited responding to the above-mentioned cases, the down-shift is unexpectedly executed, even though the driving condition does not change. Since the driving torque unsuitably and unexpectedly changes, the driver might feel uncomfortable. Consequently, it is desirable that such a prohibition of the control mode is avoided.

Figure 18:
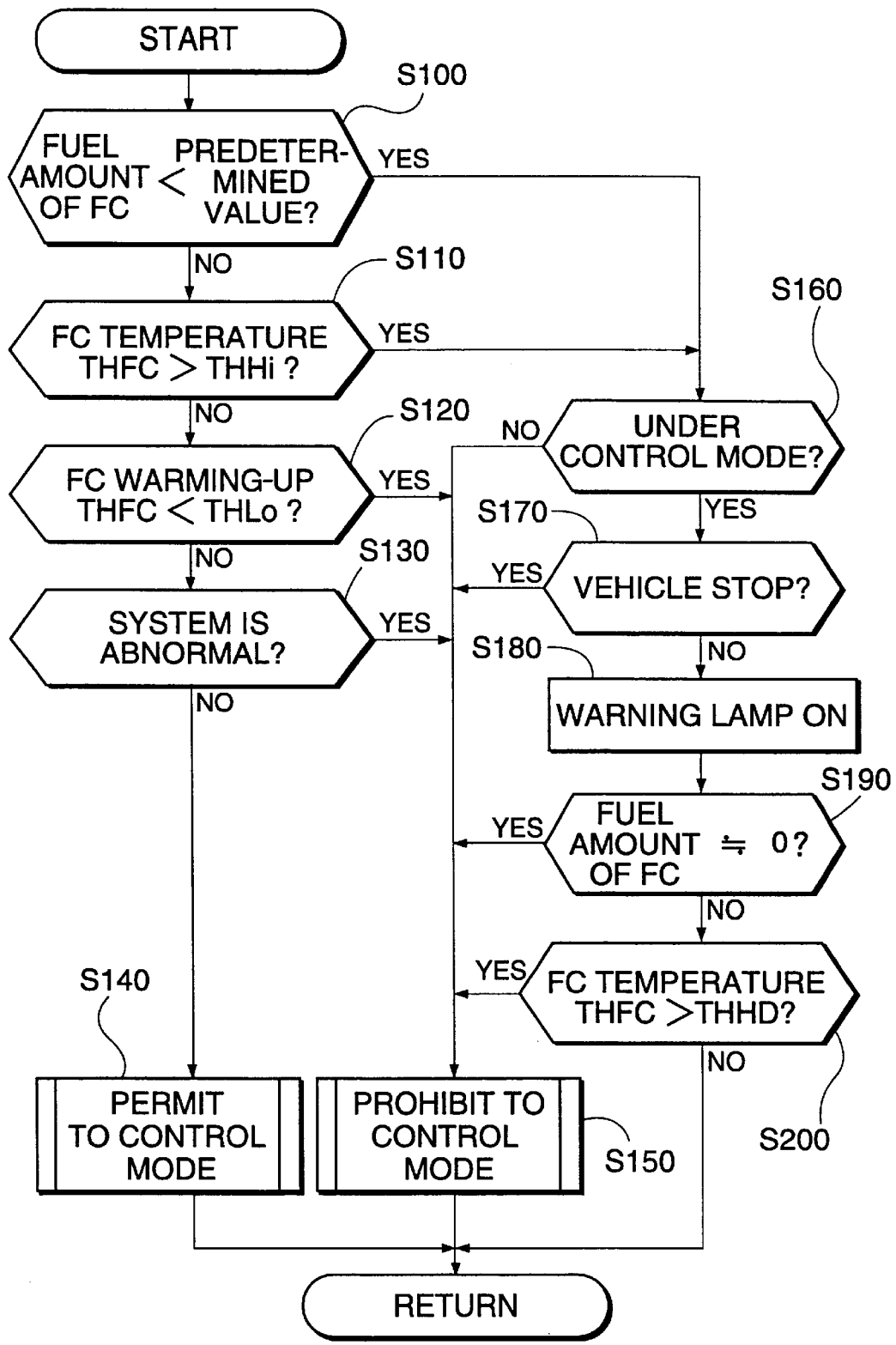
FIG. 18 is a flowchart which explains one example of an apparatus for controlling a vehicle as a fourth embodiment of the present invention.

In order to avoid the above-mentioned uncomfortable feeling, the control mode (where the torque assist control is done in $5^{th}$, $6^{th}$ gear, or etc., or where $6^{th}$ gear is permitted) is restrained in the routine shown in FIG. 18

In S160, whether the control mode is executed or not is determined. When "no" is determined (in this case the control mode is not done), the driver does not feel uncomfortable, even though the control mode is prohibited. Consequently, the routine jumps to S150, and the control mode is prohibited. The control mode continues to be prohibited until the above-mentioned condition is cancelled.

On the other hand, when "yes" is determined in S160, the routine transitions to S170. In S170, whether the vehicle stops or not is determined. When "no" is determined, the routine proceeds to S180. When "yes" is determined, the routine jumps to S150, and in S150 the control mode is prohibited. When the vehicle stops, the driver does not feel uncomfortable, even though the control mode is prohibited, because the driving torque does not change. The routine, then, proceeds to RETURN. Incidentally, it is available that the control mode is prohibited as soon as the vehicle stops. It is also available that the control mode is prohibited after a delay between the time when it is detected that the fuel amount of the fuel cell 60A is less than the predetermined value or the temperature of the fuel cell system 60 (THFC) is higher than the caution temperature (THHi) and the time when the vehicle stops, though a flowchart showing this control is, here, not shown.

In S180, the warning lamp is turned on. This indicates that the electric motor 52 can not normally output the torque.

Next, whether the fuel amount of the fuel cell 60A is nearly zero (including zero) or not is determined in S190. Specifically, whether the fuel amount of the fuel cell 60A is less than a predetermined value (which is different from and less than the predetermined value mentioned in S100) or not is determined. When "yes" is determined, the routine goes to S1150. On the other hand, when "no" is determined, the routine proceeds to S200. In S200, whether the temperature of the fuel cell system 60 (THFC) is higher than the upper limit THHD or not is determined.

When the temperature of the fuel cell system 60 (THFC) is higher than the upper limit (THHD), the routine goes to S150. When "no" is determined, the routine goes to RETURN. As mentioned above, when the fuel amount of the fuel cell 60A is nearly fully consumed or the temperature of the fuel cell system 60 (THFC) is over the permitted range, the fuel cell system 60 can not continue to supply electric power. When such a condition happens, the control mode is prohibited in S150. The driver might feel uncomfortable by the above-mentioned prohibition. Because the torque assist control can not be maintained, it can not help executing the prohibition in this case.

When the fuel amount of the fuel cell 60A and the temperature of the fuel cell system 60 (THFC) do not reach such a serious condition, the routine proceeds to RETURN. This indicates that the warning lamp is turned on, but the control mode is not prohibited, that is, once the control mode is executed, the control mode (in which the torque assist control is done in $5^{th}$, $6^{th}$ gear or $4^{th}$, $5^{th}$, $6^{th}$ gear, or in which $6^{th}$ gear is permitted and in $6^{th}$ gear the torque assist is done, or etc.) is maintained until the serious condition occurs. Consequently, the driver does not feel uncomfortable as long as the fuel cell system 60 is not under the serious condition.

On the other hand, once a serious condition occurs, the control mode is prohibited. Once the control mode is prohibited, the control mode does not restart until the serious condition is cancelled.

As mentioned above, in the apparatus for controlling the vehicle as the fourth embodiment, such conditions as that the temperature of the fuel cell system 60 is over the permitted range, that warming-up of the fuel cell system 60 is insufficient, that the fuel amount of the fuel cell 60A is small, and that the system of the fuel cell system 60 is abnormal, are always monitored. If such a serious condition occurs, the control mode is prohibited. However, there is a bit of a margin until the control mode is prohibited as follows.

(case A) The temperature of the fuel cell system 60 (THFC) goes up, and THFC is higher than the caution temperature THHi, but THFC is lower than the upper limit THHD.

(case B) Though the remaining amount of the fuel cell 60A is neither zero nor nearly zero, the amount is less than the predetermined value.

When only the above-mentioned case or cases are detected, the countermeasures are as follows.

(countermeasure α) If the vehicle is not in the control mode, the control mode is prohibited.

(countermeasure β) If the vehicle is in the control mode, the control mode continues and the warning lamp is turned on. The warning lamp notifies the driver of a possibility that the control mode is cancelled later.

On the other hand, when one of the following cases is detected, the control mode should be prohibited without a delay.

(case C) The temperature of the fuel cell 60A increases over the upper limit (THH).

(case D) The fuel amount of the fuel cell 60A is completely consumed.

(case E) The warming-up of the fuel cell system 60 is insufficient, that is THFC is lower than the lower limit THLo.

(case F) t is detected that the system relating the fuel cell system 60, the electric motor 52, or etc. is not normal.

In the above-mentioned case, the following countermeasure is executed adding to the countermeasure α.

(countermeasure γ) Even though the vehicle is in the control mode, the control mode is instantly prohibited.

By the countermeasure such as α, β, γ, the fuel cell system 60 is protected, and the driver does not feel uncomfortable as far as possible, responding to the driving circumstances or to the condition of the fuel cell system 60.

In the above-mentioned control, the control mode is changed when the case A or B is detected. Here, it is also available that the control is changed on the basis of an increasing rate of the temperature of the fuel cell system 60. For example, the caution temperature THHi is set lower in the case where the increasing rate is high, and the fuel cell 60 is required not to supply the electric power earlier.

It is also available that the condition for changing the control is varied by presuming a consumed electric power based on the amount of the assist torque of the electric motor 52 or a frequency that the electric motor 52 works.

Moreover, though the control mode is changed at the time when the condition is detected or the vehicle stops in the fourth embodiment, it is also available that the control mode is changed at a time among a predetermined plurality of times responding to the condition. If there is a time margin before the electric motor 52 falls, the control mode is changed at a time when an affect to the vehicle driving condition is low. Such a problem as torque shock of the automatic transmission 54 can be avoided by this countermeasure.

In the fourth embodiment, the control mode is compulsorily prohibited when the vehicle stops in the case A or B. It is, however, also available that the control mode is not prohibited when the vehicle stops, as long as there is a margin (that is the condition does not reach the serious condition), though the control mode is prohibited when the serious condition is detected.

It is also available that the assist torque is varied responding to the detected condition. For example, the more the degree the fall of the power outputted from the electric motor 52 is affected, the lower the assist torque is.

Furthermore, it is not only limited to the above-mentioned control mode, but it is also available that a total control including the engine 51, electric motor 52, automatic transmission 54, or etc, is adopted.

Moreover, though the control of the fuel cell system 60 is taken as an electric power supply in the above-mentioned embodiment, it is also available that the control of the battery 61 or the both of the battery 61 and the fuel cell system 60 is taken. When the battery 61 is taken, the temperature, the state of charge, etc. of the battery 61 are detected in the same way as the fuel cell system 60.

Figure 19:
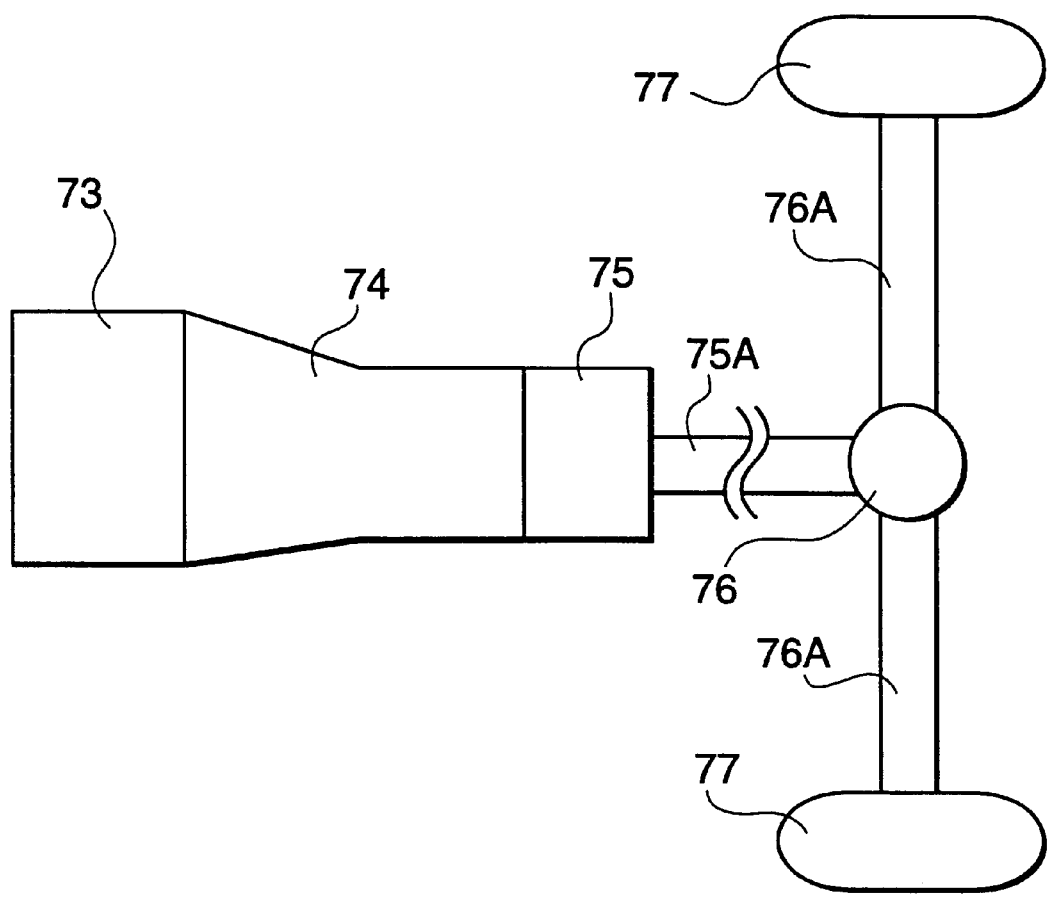
FIG. 19 is a schematic view of one of other type power trains for the hybrid vehicle to which the present invention is adopted.
Figure 20:
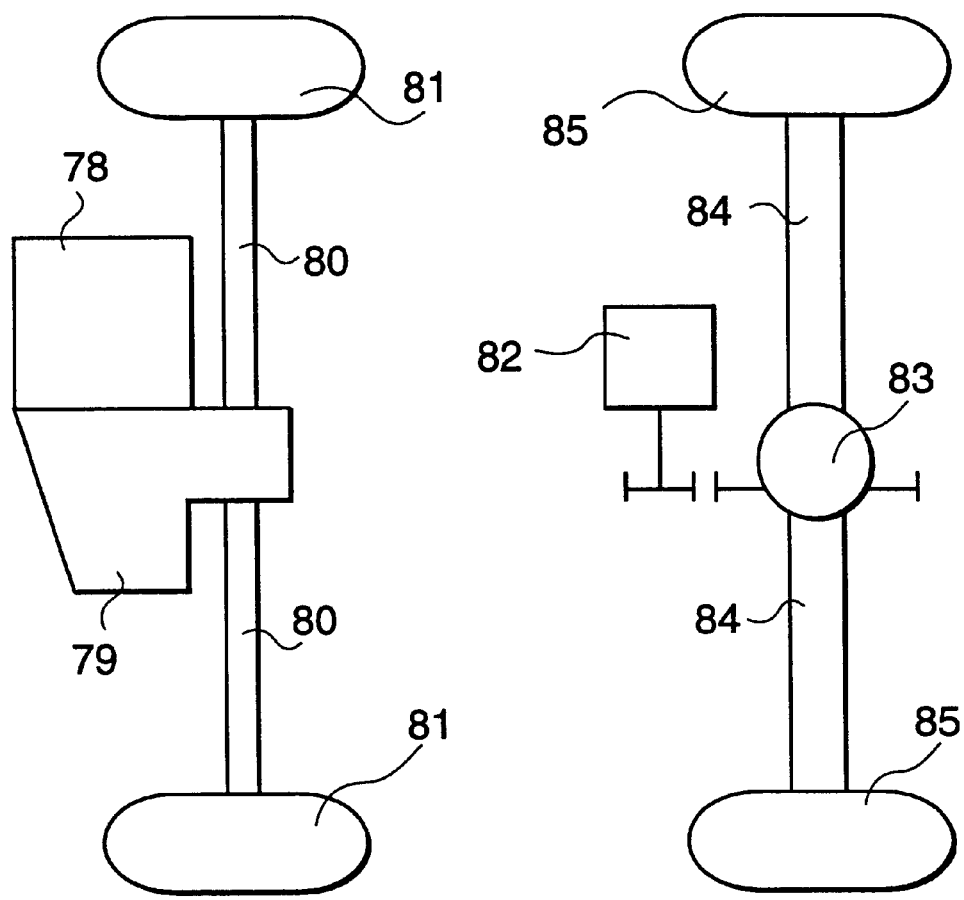
FIG. 20 is a schematic view of another type power train for the hybrid vehicle to which the present invention is adopted.

Each above-mentioned apparatus for controlling the vehicle can be adopted to other types of power trains shown in FIG. 19 or 20. FIG. 19 is one of the power train for a hybrid vehicle to which the apparatus is adopted. An automatic transmission 74 is at the output side of an engine (a first power source) 73. An electric motor (a second power source) 75 is at the output side of the automatic transmission 74. Rear wheels 77 are connected by way of propeller shaft 75A, a differential gear unit 76, and drive shafts 76A. Consequently, the automatic transmission 74 transmits torque from the engine 73 to the rear wheels 77. On the other hand, torque from the electric motor 75 is transmitted to the rear wheels 77, not passing through the automatic transmission 74.

FIG. 20 shows another type of power train. The power train shown in FIG. 20 is for a four wheel drive vehicle. A transaxle 79 is at the output side of an engine 78. The transaxle 79 contains a transmission and a differential gear unit as one body. Torque is transmitted from the transaxle 79 to front wheels 81 by way of drive shafts 80. An electric motor 82 is mounted as a second power source. Torque from the electric motor 82 is transmitted to rear wheels 85 by way of a differential gear unit 83 and drive shafts 84. In this case shown in FIG. 20, the torque of the engine 78 is not only transmitted to the front wheels 81, but the torque of the electric motor 82 can be transmitted to the rear wheels 85.

Furthermore, a continuously variable transmission (CVT) can be adopted to each aforementioned embodiment in place of the automatic transmission. In this case, if assist torque is controlled to be varied according to a continuous gear ratio of the CVT, the gear ratio can be controlled to be low without a delay. Since the engine revolutions are low, the fuel economy can be improved.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for controlling a vehicle comprising at least one wheel, a first power source, a second power source, an electric power supply and a transmission between the wheel and at least one of the power sources, the transmission transmitting driving power to the wheel, the apparatus comprising:

a detecting means for detecting a selected gear ratio of the transmission; and a torque change means for increasing or decreasing a torque of the second power source in response to the selected gear ratio of the transmission.

2. The apparatus for controlling a vehicle as set forth in claim 1, wherein the torque change means sets the torque of the transmission so that the smaller the gear ratio of the transmission, the greater the torque of the second power source.

3. The apparatus for controlling a vehicle as set forth in claim 1, wherein the second power source comprises an electric motor and wherein the electric power supply for the second power source comprises a fuel cell or a battery.

4. The apparatus for controlling a vehicle as set forth in claim 3, further comprising a gear ratio control means for controlling the gear ratio of the transmission so that the gear ratio of the transmission is high when an amount of the fuel in the fuel cell is less than a predetermined value or a state of charge of the battery is less than a predetermined value.

5. The apparatus for controlling a vehicle as set forth in claim 1, wherein the transmission comprises a forward overdrive gear.

6. The apparatus for controlling a vehicle as set forth in claim 1, wherein the torque change means increases or decreases the torque of the second power source when the transmission is in a power mode or a normal mode.

7. The apparatus for controlling a vehicle as set forth in claim 1, wherein the first power source comprises an internal combustion engine and wherein the torque change means increases or decreases the torque of the second power source in response to a burning condition of the internal combustion engine.

8. An apparatus for controlling a vehicle comprising at least one wheel, a first power source, a second power source, an electric power supply and a transmission between the wheel and at least one of the power sources, the transmission transmitting driving power to the wheel, the apparatus comprising:

a detecting means for detecting a selected gear ratio of the transmission and a driving condition of the vehicle; and an assist zone change means for changing an assist zone in response to the selected gear ratio of the transmission, the assist zone being set in response to the driving condition of the vehicle.

9. The apparatus for controlling a vehicle as set forth in claim 8, wherein the assist zone change means sets the assist zone of the transmission so that the smaller the gear ratio of the transmission, the more the assist zone is increased.

10. The apparatus for controlling a vehicle as set forth in claim 8, wherein the second power source comprises an electric motor and wherein the electric power supply for the second power source comprises a fuel cell or a battery.

11. The apparatus for controlling a vehicle as set forth in claim 10, further comprising a gear ratio control means for controlling the gear ratio of the transmission so that the gear ratio of the transmission is high when an amount of the fuel in the fuel cell is less than a predetermined value or a state of charge of the battery is less than a predetermined value.

12. The apparatus for controlling a vehicle as set forth in claim 8, wherein the transmission comprises a forward overdrive gear.

13. The apparatus for controlling a vehicle as set forth in claim 8, wherein the assist zone change means expands the assist zone when the transmission is in a power mode.

14. The apparatus for controlling a vehicle as set forth in claim 8, wherein the first power source comprises an internal combustion engine and wherein the assist zone change means expands the assist zone when the internal combustion engine is in a lean burning condition.

15. An apparatus for controlling a vehicle comprising at least one wheel, a first power source, a second power source, an electric power supply, and a transmission between the wheel and at least one of the power sources, the transmission transmitting driving power to the wheel, the apparatus comprising:

a detecting means for detecting at least one of a driving condition of the vehicle, a condition of the first power source, a condition of the second power source, a condition of the electric power supply, and a condition of the transmission;

a mode setting means for setting a plurality of control modes of increasing or decreasing a torque of the second power source in response to the condition detected by the detecting means;

a mode change means for selecting and changing the control mode in response to the condition detected by the detecting means; and an executing means for executing the control mode selected by the mode change means.

16. The apparatus for controlling a vehicle as set forth in claim 15, wherein the mode setting means sets the control mode in response to a gear ratio of the transmission.

17. The apparatus for controlling a vehicle as set forth in claim 16, wherein the mode setting means sets the control mode wherein the smaller the gear ratio of the transmission, the greater the torque of the second power source.

18. The apparatus for controlling a vehicle as set forth in claim 16, wherein the second power source comprises an electric motor and wherein the electric power supply for the second power source comprises a fuel cell or a battery.

19. The apparatus for controlling a vehicle as set forth in claim 18, wherein the mode setting means sets the control mode wherein the gear ratio of the transmission is high when an amount of the fuel in the fuel cell is less than a predetermined value or a state of charge of the battery is less than a predetermined value.

20. The apparatus for controlling a vehicle as set forth in claim 16, wherein the transmission comprises a forward overdrive gear.

21. The apparatus for controlling a vehicle as set forth in claim 15, wherein the mode setting means sets the control mode having an assist zone set in response to the driving condition of the vehicle.

22. The apparatus for controlling a vehicle as set forth in claim 21, wherein the assist zone is set in response to a gear ratio of the transmission.

23. The apparatus for controlling a vehicle as set forth in claim 22, wherein the smaller the gear ratio of the transmission, the more the assist zone is increased in the control mode.

24. The apparatus for controlling a vehicle as set forth in claim 22, wherein the second power source comprises an electric motor and wherein the electric power supply for the second power source comprises a fuel cell or a battery.

25. The apparatus for controlling a vehicle as set forth in claim 24, wherein the mode setting means sets the control mode wherein the gear ratio of the transmission is high when an amount of the fuel in the fuel cell is less than a predetermined value or a state of charge of the battery is less than a predetermined value.

26. The apparatus for controlling a vehicle as set forth in claim 22, wherein the transmission comprises a forward overdrive gear.

27. The apparatus for controlling a vehicle as set forth in claim 15, wherein the mode setting means sets the control mode wherein the torque of the second power source increases or decreases when the transmission is in a power mode or a normal mode.

28. The apparatus for controlling a vehicle as set forth in claim 15, wherein the first power source comprises an internal combustion engine and wherein the mode setting means sets the control mode wherein the torque of the second power source increases or decreases in response to a burning condition of the internal combustion engine.

29. A method for controlling a vehicle comprising at least one wheel, a first power source, a second power source, an electric power supply, and a transmission between the wheel and at least one of the power sources, the transmission transmitting driving power to the wheel, the method comprising the steps of:

detecting at least one of a driving condition of the vehicle, a condition of the first power source, a condition of the second power source, a condition of the electric power supply, and a condition of the transmission;

setting a plurality of control modes of increasing or decreasing a torque of the second power source in response to the detected condition;

selecting and changing the control mode in response to the detected condition; and executing the selected control mode.

30. An apparatus for controlling a vehicle comprising at least one wheel, an internal combustion engine, an electric motor, an electric power supply, and a transmission between the wheel and at least one of the internal combustion engine and the electric motor, the transmission transmitting driving power to the wheel, the apparatus comprising:

a detecting means for detecting a condition that causes a power outputted by the electric motor to fall;

a mode setting means for setting a plurality of control modes of increasing or decreasing a torque of the electric motor in response to the condition detected by the detecting means;

a mode change means for selecting and changing the control mode in response to the condition detected by the detecting means; and an executing means for executing the control mode selected by the mode change means.

31. The apparatus for controlling a vehicle as set forth in claim 30, wherein the mode change means restricts the available control modes in response to the condition detected by the detecting means.

32. The apparatus for controlling a vehicle as set forth in claim 31, wherein the more a fall of the power outputted from the electric motor is affected by the condition detected by the detecting means, the more the mode change means restricts the available control modes.

33. The apparatus for controlling a vehicle as set forth in claim 32, wherein the mode change means prohibits a predetermined control mode when the fall of the power outputted from the electric motor is more affected by the condition detected by the detecting means, and prevents the control mode from changing from the control mode other than the predetermined control mode to the predetermined control mode when the fall of the power outputted from the electric motor is less affected by the condition detected by the detecting means.

34. The apparatus for controlling a vehicle as set forth in claim 33, wherein the mode change means prohibits the predetermined control mode when the fall of the power outputted from the electric motor is less affected by the condition detected by the detecting means and the vehicle stops.

35. The apparatus for controlling a vehicle as set forth in claim 30, wherein at least the electric motor works in the control mode.

36. The apparatus for controlling a vehicle as set forth in claim 35, wherein the more a fall of the power outputted from the electric motor is affected by the condition detected by the detecting means, the more the mode change means restricts the available control modes.

37. The apparatus for controlling a vehicle as set forth in claim 36, wherein the mode change means prohibits a predetermined control mode when the fall of the power outputted from the electric motor is more affected by the condition detected by the detecting means, and prevents the control mode from changing from the control mode other than the predetermined control mode to the predetermined control mode when the fall of the power outputted from the electric motor is less affected by the condition detected by the detecting means.

38. The apparatus for controlling a vehicle as set forth in claim 37, wherein the mode change means prohibits the predetermined control mode when the fall of the power outputted from the electric motor is less affected by the condition detected by the detecting means and the vehicle stops.

39. The apparatus for controlling a vehicle as set forth in claim 30, wherein the mode change means selects and changes the control mode in response to the degree the fall of the power outputted from the electric motor is affected by the condition detected by the detecting means.

40. The apparatus for controlling a vehicle as set forth in claim 39, wherein the detecting means detects the fall of the power outputted from the electric motor based on the temperature of the electric power supply and the mode change means selects, when the temperature of the electric power supply is within an allowed range, is close to and less than an upper limit, and is higher than a predetermined value, the control mode selected when the fall of the power outputted from the electric motor is less affected by the condition detected by the detecting means, and selects, when the temperature is over the upper limit, the control mode selected when the fall from the power outputted from the electric motor is more affected by the condition detected by the detecting means.

41. The apparatus for controlling a vehicle as set forth in claim 40, wherein the detecting means detects the fall of the power outputted from the electric motor based on the temperature of the electric power supply and the mode change means selects, when the temperature of the electric power supply is less than the lower limit, the control mode selected when the fall of the power outputted from the electric motor is more affected by the condition detected by the detecting means.

42. The apparatus for controlling a vehicle as set forth in claim 39, wherein the detecting means detects the fall of the power outputted from the electric motor based on the temperature of the electric power supply and the mode change means selects, when the temperature of the electric power supply is less than the lower limit, the control mode selected when the fall of the power outputted from the electric motor is more affected by the condition detected by the detecting means.

43. The apparatus for controlling a vehicle as set forth in claim 39, wherein the detecting means detects the fall of the power outputted from the electric motor based on the state of charge of the electric power supply, the mode change means selects, when the state of charge of the electric power supply is detected to be less than a first predetermined value, the control mode selected when the fall of the power outputted from the electric motor is less affected by the condition detected by the detecting means, and the mode change means selects, when the state of charge of the electric power supply is detected to be less than a second predetermined value of the electric power supply, the control mode selected when the fall of the power outputted from the electric motor is more affected by the condition detected by the detecting means, the second predetermined value being less than the first predetermined value.

44. The apparatus for controlling a vehicle as set forth in claim 43, wherein the electric power supply comprises a fuel cell and the detecting means detects the fall of the power outputted from the electric motor based on the state of charge of the fuel cell.

45. The apparatus for controlling a vehicle as set forth in claim 39, wherein the detecting means detects the fall of the power outputted from the electric motor based on an abnormal condition of the electric power system and the mode change means selects, when the electric power supply is detected to be abnormal, the control mode selected when the fall of the power outputted from the electric motor is more affected by the condition detected by the detecting means.

46. The apparatus for controlling a vehicle as set forth in claim 39, wherein the mode change means changes the control mode after a delay in response to the degree of the fall of the power outputted from the electric motor.

47. The apparatus for controlling a vehicle as set forth in claim 39, wherein the mode change means changes the control mode after a delay between the detected time when the fall of the power outputted from the electric motor is detected and the time when the vehicle stops in response to the degree of the fall of the outputted power of the electric motor.

48. The apparatus for controlling a vehicle as set forth in claim 39, wherein the detecting means detects at least two of an increasing of the temperature of the electric power supply, an insufficient warming-up of the electric power supply, a low state of charge of the electric power supply, and an abnormality of the electric system.

49. A method for controlling a vehicle comprising at least one wheel, an internal combustion engine, an electric motor, an electric power supply, and a transmission between the wheel and at least one of the internal combustion engine and the electric motor, the transmission transmitting driving power to the wheel, the method comprising the steps of:

detecting a condition where a power outputted by the electric motor falls;

setting a plurality of control modes of increasing and decreasing a torque of the electric motor in response to the detected condition;

selecting and changing the control mode in response to the detected condition; and executing the selected control mode.

* * * * *